United States Patent [19]
Hamby et al.

[11] Patent Number: 5,848,274
[45] Date of Patent: Dec. 8, 1998

[54] INCREMENTAL BYTE CODE COMPILATION SYSTEM

[75] Inventors: John Hamby, Issaquah; Niklas Gustafsson, Bellevue; Patrick Lau, Renton, all of Wash.

[73] Assignee: Supercede, Inc., Bellevue, Wash.

[21] Appl. No.: 645,955

[22] Filed: May 10, 1996

Related U.S. Application Data

[63] Continuation-in-part of Ser. No. 608,820, Feb. 29, 1996, Pat. No. 5,764,989.

[51] Int. Cl.⁶ .................................................. G06F 9/45
[52] U.S. Cl. ......................... 395/705; 395/701; 395/704; 395/706; 395/685
[58] Field of Search .................... 395/701, 702, 395/704, 705, 707, 710, 685, 706

[56] References Cited

U.S. PATENT DOCUMENTS

| | | | |
|---|---|---|---|
| 4,802,165 | 1/1989 | Ream | 371/19 |
| 4,809,170 | 2/1989 | Leblang et al. | 364/200 |
| 4,953,084 | 8/1990 | Meloy et al. | 364/200 |
| 5,170,465 | 12/1992 | McKeeman et al. | 395/700 |
| 5,175,856 | 12/1992 | Dyke et al. | 395/700 |
| 5,182,806 | 1/1993 | McKeeman et al. | 395/700 |
| 5,193,191 | 3/1993 | McKeeman et al. | 395/700 |
| 5,201,050 | 4/1993 | McKeeman et al. | 395/700 |
| 5,204,960 | 4/1993 | Smith et al. | 395/700 |
| 5,265,254 | 11/1993 | Blasciak et al. | 395/700 |
| 5,291,583 | 3/1994 | Bapat et al. | 395/500 |
| 5,307,499 | 4/1994 | Yin et al. | 395/700 |
| 5,325,531 | 6/1994 | McKeeman et al. | 395/700 |
| 5,327,562 | 7/1994 | Adcock et al. | 395/700 |
| 5,339,431 | 8/1994 | Rupp et al. | 395/700 |
| 5,339,433 | 8/1994 | Frid-Nielsen | 395/700 |
| 5,355,494 | 10/1994 | Sistare et al. | 395/700 |
| 5,357,628 | 10/1994 | Yuen | 395/575 |
| 5,371,747 | 12/1994 | Brooks et al. | 371/19 |
| 5,375,239 | 12/1994 | Mortson | 395/700 |
| 5,426,648 | 6/1995 | Simamura | 371/19 |
| 5,432,795 | 7/1995 | Robinson | 371/19 |
| 5,459,868 | 10/1995 | Fong | 395/700 |
| 5,590,331 | 12/1996 | Lewis et al. | 395/708 |

FOREIGN PATENT DOCUMENTS

| | | |
|---|---|---|
| 90307228 | 2/1990 | European Pat. Off. . |
| 91115971 | 9/1991 | European Pat. Off. . |
| 2701580 | 10/1993 | France . |
| H6-83597 | 3/1994 | Japan . |
| H6-161726 | 6/1994 | Japan . |
| H6-266563 | 9/1994 | Japan . |
| H6-274349 | 9/1994 | Japan . |
| PCT/US91/04064 | 6/1991 | WIPO . |
| PCT/US93/05368 | 6/1993 | WIPO . |
| PCT/US94/00041 | 6/1993 | WIPO . |
| PCT/US94/00342 | 6/1993 | WIPO . |

*Primary Examiner*—Emanuel Todd Voeltz
*Assistant Examiner*—Kakali Chaki
*Attorney, Agent, or Firm*—LaRiviere, Grubman & Payne

[57] ABSTRACT

An incremental byte code compiler which provides a high-performance execution environment for dynamically linked languages and for distributed target-independent applications. The execution environment provided by the present invention includes an incremental byte code compiler for generating IL symbols and code objects from a byte code source file, a persistent symbol table for storing the IL symbols and code objects, and an incremental imager for dynamically forming the image of the program from the code objects. The present invention further provides an extremely efficient methodology for dynamically adding program elements to a program under execution.

6 Claims, 14 Drawing Sheets

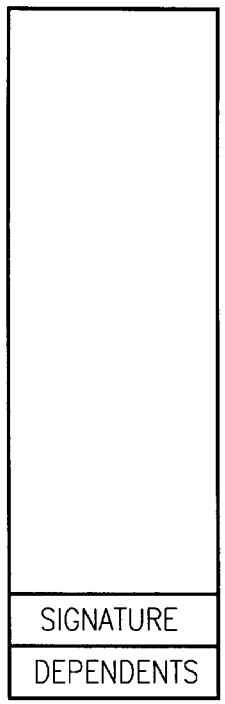
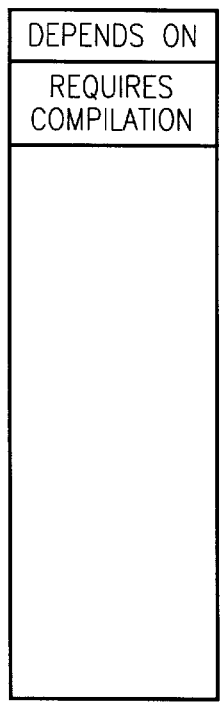
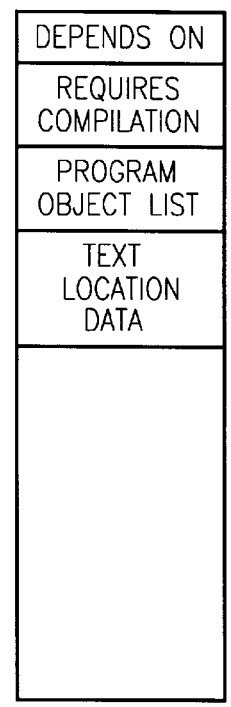
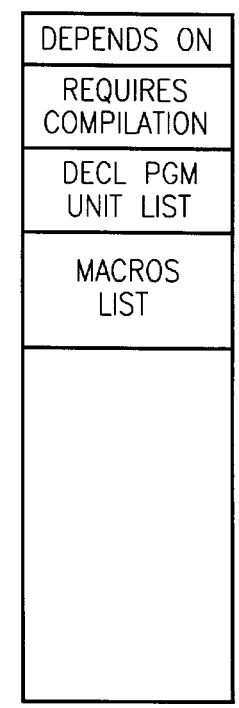
FIG. 3  FIG. 4  FIG. 5  FIG. 6
Source File A
```
class C {
        int X;
public:
        int Fred ( );
        int Barney ( );
};
```
Source File B
```
int C:: Fred ( )
{
return X;
}
int C:: Barney ( )
{
return Fred ( );
};
```
Source File A (modified)
```
class C {
        int X;
        float X;
public:
        int Fred ( );
        int Barney ( );
};
```
FIG. 7  FIG. 8  FIG. 9

INCREMENTAL BYTE CODE COMPILATION SYSTEM

REFERENCE TO PARENT APPLICATION

This is a Continuation-in-Part of application Ser. No. 08/608,820, filed Feb. 29, 1996 now U.S. Pat. No. 5,764,989.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to run-time execution environments for distributed target-independent software applications. One such target-independent application includes the execution of Java applets distributed over a wide area net. The principles of the present invention are also applicable to high performance execution environments for dynamically-linked languages, whether distributed or not.

BACKGROUND ART

Developing a computer software product (hereafter, "software") is a complex cyclical process which requires significant expenditure of time on the part of the software development team (hereinafter, the "developer"). This development process is often referred to in terms of "edit—compile-link—run", or "edit—compile-test", which refer to some of the major steps of the development process. For reasons of technical superiority and programmer productivity, a significant amount of commercially produced software is currently developed using an object oriented programming language (OOL). By way of example, but not limitation, some languages which support such object oriented programming are C++ and Smalltalk. Programs developed using these object oriented languages are not written in machine code format, and hence must be translated from the OOL source code in which they are written into object code which is machine-executable. Such machine code programs operate efficiently and hence rapidly on a given computational platform. This is typically done through the process of compilation or interpretation. Compilers translate source code into machine-level instructions which are executed by the hardware. Interpreters translate source code into pseudocode (hereinafter PCODE) which is executed using a PCODE interpreter. While interpreters enable a programmer to effect changes to a program while it is running, the PCODE interpreter introduces an extra level between the programmer and the hardware, further reducing performance.

Because all but the simplest programs are written in sections, e.g. modules, each of the source code modules must be linked together to form the image of the complete program (hereinafter, the "image"). This linking process typically includes a "fix-up" which, among other things ensures that each of the modules is correctly addressed and addressable. Once linked, the image must be loaded and executed. During execution, and when the developer encounters an error (or "bug") in the image, the program typically halts execution or behaves erratically. Traditionally, this means that program execution halts or must be halted, before a separate program, a debugger, is invoked to assist in determining the error to the faulty executable program. After the developer locates the source of the error using the debugger, he then edits his source code to eliminate the error, recompiles the code, re-links it, and then re-loads it. The programmer must then re-create the exact error state which caused the failure to verify the efficacy of the fix.

While prior art compilers ultimately produce efficient machine language code executable files, use of such files during, debugging is both cumbersome and time consuming. This is due to the fact that changes in source code files which are invoked by other source code files have previously required, at a minimum, the recompilation of each of the affected files and the relinking of all the resulting object code files into a program image.

Because each of the preceding software development steps must be conducted by talented computing professionals, the cost for each of the steps is high. Accordingly it has long been, and continues to be, a primary aim of the software development industry to develop methods and systems to increase the efficiency of the development cycle. To this end, improvements have been made to many of the development steps.

A series of U.S. Patents to McKeeman et al. (U.S. Pat. Nos. 5,170,465; 5,182,806; 5,201,050; and 5,325,531 inter alia) teach a computer assisted software engineering system called "RCASE". The RCASE system employs a fine grain incremental compiler including an incremental scanner, an incremental linker, an incremental make facility, and a virtual memory manager to reduce thrashing. While this methodology may provide economies of operation during the software development cycle, it retains many of the steps of the traditional development cycle while adding a few of its own. RCASE is thus seen to represent an incremental improvement to the traditional development cycle rather than a new development system. McKeeman et al. in U.S. Pat. No. 5,193,191 teach the previously discussed incremental linker.

Another incremental compiler is taught by Smith et al. in U.S. Pat. No. 5,204,960. The '960 compiler teaches a system whereby source and object files are organized into logical blocks and stored. An intermediate file is created which contains information regarding these logical blocks and is likewise stored. If a change is made to one portion of the source file, only the logical block involved is recompiled and patched into the object file. Again, Smith represents an incremental improvement to one phase of the traditional software development cycle.

WO 95/00901 and WO 95/00904 to Taligent, Inc. teach an incremental build system and linker system. Taken in sum, these references attempt to replace the traditional batch-mode programming systems. In a typical compiler symbol table, references to other data often make tip more than half of the contents of data items. Thus, reference translation presents a significant source of computational overhead. One solution to the translation problem is to use Ids, as taught in the '901 reference. The incremental builder taught by the '901 reference teach modeling a computer program as project component and a collection of building components, each representing a single compilable language element. Those components which provide the model for a computer program are stored for access during the build process.

The stored components are accessed in sequence, and using a compiler, dependencies associated with a component are calculated to develop client and reference lists. Finally, the components are compiled to build the computer program using the properties of the components along with the compiler dependencies. The '901 reference thus reads on a system in which the program is not defined in files, but in terms of components, addressable by means of Ids. In this manner, the '901 reference teaches a system which does not have the previously discussed translation problem, but replaces it with a number of independently addressable (and reasonably complex) components, the building and utilization of which are a major source of computational overhead. These contribute to the lack of computational efficiency of this system.

The '904 reference teaches an incremental linker which utilizes the independently addressable components created by the Incremental Builder of the '901 reference to link only those components which have been modified during the edit phase of the development cycle. Taken in sum, it will be appreciated that the system taught by the '901 and '904 references again represent an incremental improvement to the steps of the traditional software development cycle. The necessity to perform those steps remains unchanged.

From the preceding discussion it will be appreciated that significant effort has been expended on improving the efficiency of several of the steps of the software development cycle. What has not been realized, up to this time, is the significant increase in programmer efficiency which must ensue by reducing the number of the steps of the development cycle.

It will be further appreciated that while some of the previously discussed inventions have overcome some of the "batch processing mentality" of the traditional software development cycle, none of them completely eliminate the need for performing at least some of those steps discretely; i.e., to some extent in batch mode. Accordingly, one underlying condition prevails: once an error is discovered, program execution must be halted, and any actual error discovered during debugging and thereafter corrected during editing will have been removed. In order to verify that the error was actually corrected during editing of the file (i.e., that the fix was effective in removing the bug), the exact state of the program, its error state, must be recreated. Since program execution has been halted, the developer must re-load the program re-run it, and ensure that each and every variable is set to its previous value when the error occurred to re-create exactly its error state on failure. When a developer is working on a complex software system recreating the error state thus is a non-trivial task. Further, this step is rendered more problematical in that it is difficult to determine if the error state has been exactly duplicated, further rendering post-fix validation time-consuming, expensive, and error prone.

A development system which re-defines the development cycle by presenting the developer with fewer steps during each iteration of the cycle would present significant economies in time and expense over prior art schema. Further economies would be realizable if the system were more efficient, and presented faster execution speeds, than prior compilation schemes. If only some methodology could be found which enables a developer to debug and edit source text interactively, without halting program execution, the methodology would at once obviate the need to re-create the error state and verify the efficacy of the fix. Accordingly, profound and hitherto unattainable levels of developer productivity would be realized.

During efforts to perfect the invention which implemented the previously discussed advantages, it became apparent to the inventors that, with minor modifications thereto, the underlying incremental technology taught herein may, with good effect, be utilized in a number of different computational problems.

One such problem is the runtime (execution) speed of distributed target-independent applications. An example of such an application includes one written in the Java programming language, and distributed over a wide area net as a collection of one or more applets. One such a wide area net is the Internet, but the principles of the present invention may, with equal facility, be implemented not only on other network architectures but also for use with similar languages. As will be shown, the principles of the present invention are equally applicable for high performance execution environments for dynamically linked languages, and again, Java is an example of such a language.

Where applications are distributed over a network, some new and distinct problems eventuate: the first such problem is that the size of the program must be small, so that the cost of transferring the program from the point where it resides (the server) to the point where it is to be executed (the client) is minimal. This fact typically precludes the use of normal binary images in target machine code format since these images are normally wasteful expressions of the program. The choice left to the software developer then is between source code, the utilization of which divulges the underlying program logic, or some sort of byte code. Byte code is a binary representation of the program, but at a higher level of abstraction than the executable images.

On a heterogenous network, where the clients are of varying hardware architectures, executable images are not feasible, since one version of the software per client platform must, of necessity, be maintained. Accordingly the solution of choice is therefore to use some form of target-independent byte code, as above, which can be translated or interpreted at the point of execution (the client).

This solution however gives rise to a second problem: the use of the previously discussed byte code normally requires an interpreted execution environment, or a compiled environment, where the code quality is less than that of a statically compiled program. In other words, the use of dynamically linked languages like Java has not, heretofore, enabled the dynamic loading of applets (hereinafter referred to as program units) during execution in a computationally efficient manner.

Heretofore, the solution to the previously defined problem has been to use a byte code representation of the program, which is both compact and target-independent, and then have an interpreter at the client "execute" the byte code. This process is very inefficient and slows distributed applications considerably. This inefficiency has, to some extent, been remedied by the use of byte code compilation, which takes the byte code at the client and compiles it, one function at a time, to the target architecture code. The use of byte code compilation adds time required prior to starting the application, but makes the application run considerably faster once compiled. The overall result is a smaller total execution time for all but the most trivial applications.

Byte code compilers typically work by compiling one function at a time, while not completely abandoning the use of an interpreter. Some functions are interpreted by this system, some are compiled, and then executed by the hardware. This mixture of function translations is only possible by generating code which is less than optimal, particularly around function calls, and affects the runtime performance of the application. While the code generated by byte code compilers is less than optimal, it is still more computationally efficient over strictly interpretive systems.

Additionally, previous byte code compilation schemes enable the dynamic loading of program units by making the code less efficient than the code generated for a static program. In other words, the cost of anticipating dynamic loading is distributed over the entire application.

If a methodology could be found which enabled a client-side compiler to execute a program without requiring compilation each time the program is executed, significant benefits in computational efficiency would ensue. Such a compiler should enable the user to support languages such as Java that are dynamic, and allow the pieces of the program to be added to the program as it is running. While, as previously discussed, this latter capability is possible in other byte code compilation systems, this is only true because the cost of dynamically adding program pieces is distributed over the entire application. Ideally a client side compiler would only be invoked at the point where a new program element is loaded. At all other times, the client side compiler should enable execution of the program at the same speed as a statically compiled program.

DISCLOSURE OF INVENTION

In accordance with one aspect of the invention, there is provided an interactive computer program development system that enables real-time debugging of a program as it is compiled without the need for batch recompilation, re-linking, re-loading or the need for the developer to re-create error states. In accordance with the principles of the present invention, this interactive system includes a computer system having a debugger resident therein, and having a given set of source code files. When a developer invokes the debugger for the first time for a given set of source code files, an incremental builder resident in the system is invoked which translates the source code files into code objects and their corresponding intermediate language (IL) symbols. The code objects and IL symbols are stored in a resident persistent symbol table. A resident incremental imager utilizes the code objects and IL symbols to form run-time code objects. The incremental imager then links together run-time code objects forming a program image which is executable. The actions of the program image and the computer program are coordinated through a probe and a runner. The probe executes in the incremental imager process and the runner executes in the process of the built program. Thus, the image is executed, and the image embodies the program simultaneously in two separate threads of execution using memory-mapped data.

In accordance with the principles of the present invention, this is accomplished by means of a new compilation system (hereafter referred to as an Incremental Builder) which produces a novel type of translated structure, the code object; and an Incremental Imager which forms the program image from code objects and their respective intermediate language (IL) symbols stored in a persistent symbol table. After the image is formed, the program is executed in a separate thread of execution in a separate, protected address space. A proprietary debugger interactively assists the developer in debugging the program under development in virtual real time using the formed image and the executable program. Finally, after a given program has been built and thoroughly debugged, the developer invokes an extractor which converts it into an executable file (e.g., an ".EXE" file). "Thread of execution" refers hereinafter to a logical structuring of a program—each thread of execution has its own sequence of instructions which it will execute. An "address space" is a mapping of memory addresses that are unique to a specific set of threads. Each address space and its associated set of threads define a "process".

A code object is the fully translated machine language implementation of a function definition, or the initial value of a variable, which refers to IL symbols representing other code objects by means of direct memory reference as opposed to Ids. Code objects and IL symbols are low level data structures used to create an image, i.e., the "program". Code objects contain the description of those symbols to which the function refers. The IL symbol contains a description of those code objects which refer to the function. The code objects and their respective IL symbols, as well as language symbol table objects are stored in a persistent symbol table.

An overview of the operation of the system of the present invention follows: After creating the source code files which define a given executable file (e.g., the entire program) or a self-contained portion of a program having no unresolved external references (e.g., a dynamic link library), the developer invokes the debugger to debug the source files. The debugger then programmatically invokes the Incremental Builder of the present invention, which first determines if the source code has been previously compiled and saved in a persistent symbol table. Where the source code has not been previously incrementally compiled (hereinafter the term "compiled" will be replaced by the term "built", the latter term being more descriptive of the actual process), the Incremental Builder would determine that no previously built version exists in the persistent symbol table, and would translate the files in toto. Where the source code has been edited, and hence previously incrementally built, the Incremental Builder determines that a previously built version exists in the persistent symbol table, and would only translate those portions of the source code whose code objects were affected by the edited portions of the original source code.

The persistent symbol table takes the form of an object-oriented database. Note that in the present context, persistent means that it is capable of being stored to a persistent data storage device, not necessarily that such storage has actually occurred. Of course, when a developer ceases work on a project under development, for instance at the end of the work day, the persistent symbol table could well be stored in such a persistent storage device. Prudent computing practice would usually so dictate.

Use of an object-oriented database enables the Incremental Builder to build data structures using the exact same structure in the file as is used in system memory by the Incremental Builder while it is running. This results in no time lost in converting between file format and memory format and hence eliminates redundancies and significantly increases execution speed over previous compilers. The database is not discarded when system operation is terminated.

After they are formed by the incremental builder, IL symbols and their corresponding code objects are stored in memory. During image formation code objects are duplicated by the Incremental Imager to form the image as run-time code objects. After the image is formed, the program is executed under a separate thread of execution in a separate, protected address space. The probe and the runner coordinate the actions of the development system and the image (which embodies the program being developed). The probe executes in the Imager process and the runner executes in the process of the built program.

Should an error be detected as the program is executed, program execution under the runner is halted. The operating system transmits data relative to program failures to the debugger, which translates this data into information relating to which line or lines of source code caused the failure. When the debugger notifies the developer of the failure, this information is passed to him or her.

After the developer edits the source code file to obviate the program failure, he can instruct the system to incrementally compile and update the modified portions of the program, resulting in new IL symbols and code objects which implement those modifications. The Builder incrementally compiles only those program units which relate to the edited source code. From the new code objects and IL symbols the incremental imager forms an updated image of the program, and program execution continues. Note that the steps required by the prior art of linking and loading source code to first update the .EXE file and then of re-creating the exact error state which caused the failure are eliminated.

After a given program has been built and thoroughly debugged, the programmer converts it into an executable file (e.g., an ".EXE" file) by means of a separate module, the Extractor. This .EXE file is the image used by a traditional development system, and by the underlying operating system to start an application process. .EXE files are very useful for production-level distribution of software: indeed they are still necessary in order to produce a stand-alone software product. What is no longer necessary is the need to use .EXE files in the software development process, for which they are not well suited due to their static nature.

Code objects resident in the persistent table are persistent and are not modified as a result of system termination, debugging or other programmer action. When a function (or data) definition is recompiled, a new code object representing the new definition is stored in the persistent symbol table, and the function's (or data's) IL symbol is updated to point to the new code object.

The system of the present invention presents several productivity advantages over prior art translators. A major advantage is that the system of the present invention enables the programmer to change the program while the program process is still "live". This obviates the need to stop the program, debug it, edit the source code, batch recompile, and to recreate the error state which caused the "bug" in order to verify the efficacy of the fix. It further completely obviates the need for re-linking and re-loading the program.

A second major advantage of the image formation scheme detailed herein is that a program developer can run a program until it crashes, correct those lines that caused the crash, and continue. Once the source code line which caused a program crash is modified and corrected, the system continues in operation without further developer input until the next system crash. In this manner, once the developer corrects source code errors, the crash can be said to virtually have not occurred.

At least two very important concepts help define the system of the present invention. First, the Incremental Builder generates code objects as opposed to object files. This fact is central to the system of the present invention being able to compile pieces of files, producing code objects only for new declarations or those source code lines which have changed.

A second concept central to the operation of the Incremental Builder of the present is that it derives the structure of what is represented in the source file and then divides the source file into program units which can be effectively incrementally recompiled. The division to program units is coarse enough so that memory requirements are small enough to be practical for current computer systems and fine enough for very fast response.

With respect to debugging, traditional debuggers usually contain an interpreter which, upon request by the developer, evaluates expressions during program execution. Some special-case expressions, (e.g. function calls) are in fact evaluated in the real application process by executing machine instructions.

In contrast, the debugger of the present invention uses the actual compiler to produce a small code object, which is dynamically inserted into the incremental image, and executed directly. This enables the programmer to go beyond mere interactive evaluation of simple expressions and gives him the ability to amend his program with expression evaluations and statement executions that are integrated into his program. This is performed at the same speed as any other part of the program. By way of example:

To implement a conditional break point (such as "stop here if this condition is true"), all other known debuggers set a break point at the desired location, execute the program until it gets there and interpret the expression (which can't be too complex). If the condition is false, execution again continues until that point in the program is reached again. Then the condition is tested again, etc. While these tests are hidden from the programmer, they nevertheless require large amounts of execution time to perform.

In contrast, the debugger of the present invention uses the compiler to build a code object for the condition, incrementally updates the image, and inserts code at the point in the program where the debugger is supposed to break to evaluate the condition directly in the application process, at full speed. Only when the condition is true does the application actually stop, and involve the debugger. Nothing is hidden from the user—the debugger isn't doing anything "behind his back". Further, the conditions may be arbitrarily complex.

The switching back and forth between the application and the debugger in the traditional software development cycle requires great deal of time and significantly reduces system performance. Traditionally, condition interpretation is also much slower than condition execution. In contrast, the debugger of the present invention tests the condition as a part of the application, and does not suffer this severe performance penalty. This results in much better turn-around time for conditional breakpoints, which are now generally avoided by programmers due to their poor performance and the fact that the available conditions are often too trivial to be of any use.

The debugger feature of the present invention is inherent in system design and is not a separate module. Therefore, the compiler and the debugger cannot disagree on the meaning of anything. Furthermore, this debugging schema is much faster than those of prior art debuggers. Another feature of the debugging schema of the present invention is that it does not require termination of programming execution to effect debugging, or restarting once debugging is completed. The system of the present invention enables debugging to start and stop at any point during program development. For instance, if the program attempts to execute an undefined function, the system generates a dialog that gives the developer an opportunity to define the function. The developer enters the function and the system compiles it, updates the image, and continues execution by restarting only the function call instruction, not the entire program.

From the foregoing, it will be appreciated that compiling, linking and debugging are all performed by the system of the present invention. It will be further appreciated that the need, upon the occurrence of a "bug" in the system under development, to stop the compilation process, edit the source code, recompile the source code to object code, re-link the object code to form an executable image, load the executable image, and recreate the error state which caused the bug are all completely obviated unless the program's execution has unrecoverably corrupted its memory state. Furthermore, the time required to verify the efficacy of the fix is drastically reduced, because, inter alia, program execution never ceased, which means that the exact state of the program at error inception is maintained.

Furthermore, the previously discussed incremental image formation technology enables the support of dynamically linked languages such as Java and enables pieces of a program to be added as the program is running. Because compilation, as taught herein, is effected only at the point where a new program element is loaded, the computational cost of dynamically adding in program elements is minimized because the program otherwise runs at the same speed as a static program. The previously discussed incremental technology may be modified to provide a client-side incremental byte code compiler which utilizes the persistent symbol table to cache compiled applications, so that they do not require compilation each time the application is executed.

Rather than relying on an interpreter to provide dynamic loading capability, the principles of the present invention utilize the incremental image formation technology taught herein to enable the dynamic loading of programs. This presents the user of the present invention with a tremendous advantage in execution speed over users of prior art solutions. Furthermore, the principles of the present invention do not rely on an interpreter to dynamically decide which program units get compiled and which stay interpreted. The incremental byte code compiler of the present invention compiles the entire byte code file and may therefore rely on the entire program as also being compiled. This enables the present invention to generate much more efficient binary code than prior art selectively compiling interpreters.

Prior byte code compilation schemes, which do not have the advantage of a persistent symbol table in which to cache the results of byte code compilation must of necessity compile all of the byte code which is ultimately compiled every time the program is executed. The persistent symbol table taught herein enables the storage of the results of byte code compilation as code objects, thus eliminating the need to compile the code each time the program is loaded. This of course gives rise to significant advantages in computational efficiency over prior byte code compilers.

Another weakness of prior byte code compilation schemes is that they compile only portions of the program, which means that the code quality suffers greatly, as the generated code has to anticipate that a function which it calls may or may not be compiled. The present invention takes significant advantage of the fact that all pieces of the program are compiled so no performance penalty is engendered, compared to regular compilation systems. Finally, prior solutions to the problem have relied on an interpreted environment to achieve dynamic load behavior which further degrades performance. The present invention does not rely on inefficient interpreter technologies, but is instead built on the previously discussed incremental image formation technology.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawing taken in conjunction with the following detailed description of the Best Mode of Carrying Out the Invention. In the drawing:

FIG. 3 is a diagram illustrating the properties of a generic program object according to the principles of the present invention.

FIG. 4 is a diagram illustrating the properties of a generic program unit.

FIG. 5 is a diagram illustrating the properties of a declaration program unit.

FIG. 6 is a diagram of the properties of a source file program unit.

FIG. 7 is a tabulation chart of an exemplary first source file A.

FIG. 8 is a tabulation chart of an exemplary second source file B.

FIG. 9 is a tabulation of a modified version of exemplary source file A.

Figure 1A:
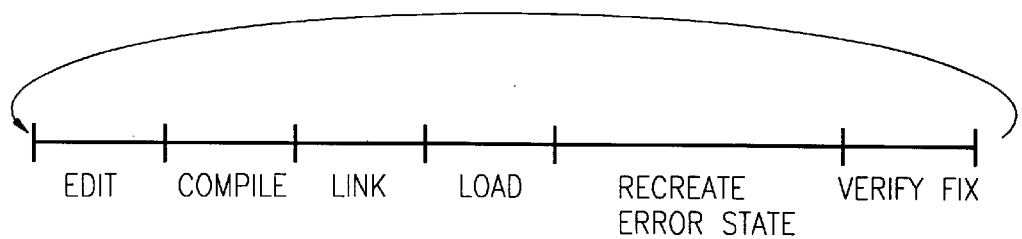
FIGS. 1A–1C represent a diagram illustrating a temporal comparison of the software development cycle according to the present invention compared to both the traditional view of such a cycle and the improvements thereto obtainable using incremental technology alone.

Reference numbers refer to the same or equivalent parts of the invention throughout the several figures of the drawing.

BEST MODE OF CARRYING OUT THE INVENTION

Definitions

In order to provide for a fuller understanding of the system of the present invention, and to differentiate some of the concepts and constructs thereof from the work of others, the following definitions are provided:

File: As used herein, a file embodies, in the broadest sense, a stream of program text, e.g., source text. It will be immediately apparent to those of ordinary skill in the art that this definition includes traditional file-oriented structures, but further comprehends, for instance, undifferentiated data streams.

Program: As used in the description of the system of the present invention, a program consists of a set of files, the declarations contained therein, and a description provided by the developer of the relationships between the program files. This description is referred to as a 'project'.

Declaration: A declaration in C++, or any declarative programming language, is a smaller unit of the program description than a whole file. Program declarations typically refer to each other, and form a network of dependencies herein called a dependency graph. It should be noted that this term has an altogether different meaning than the term 'dependence graph', in common use in compiler optimization theory.

Declarations are of two fundamentally different types: those declarations which have only a compile-time representation, and those that have also a run-time representation. The type of a given declaration will depend on the language, but in the C++ programming language, examples of the former are typedefs, enumeration type specifiers and function declarations. In the same language, the latter are exemplified by variable definitions, function definitions, and, to some extent, class definition types.

Program Unit: The smallest entity which is compiled at one time. A program unit is, however, more than a simple declaration. Each program unit contains one or more declarations. Program units represent pieces of source files, not independent program entities. A program unit is similar, but not equivalent, to a 'component' in the previously discussed '901 and '904 references. Unlike those "components", a program unit is not an independent article that can be named or referred to by any means other than from other program units. Therefore, program units have far fewer properties than do components, and are hence more efficient to form and utilize. Further, program units are subject to a strict sequential ordering within a file, while components are not.

Another distinction between the '901 components is that program units are not referred to by ID. Instead, program units are referred to by direct memory reference. The difference is similar to looking up a phone number in a phone book—whereas the '901 reference makes note of the name of the person to call in a given situation, and therefore the phone number must be looked up every time it needs to call the person, the present invention notes the person's phone number, and doesn't care who is called, since it is known that the right number is being called.

Symbol Table: The symbol table is the central and fundamental repository of information about the program that the compiler gathers from the program constructor in terms of relations between files, or deduces from the program text itself as it compiles its program units. While all known compilation systems have a symbol table, the system of the present invention utilizes the symbol table to store more information therein than in any known prior compiler.

It should be noted that the word 'table' is not being used here in the traditional meaning that it has, for example, in relational database theory. A table is normally a vector of homogeneous records, each with exactly the same fields as the others. A compiler symbol table, however, is simply a large set of heterogeneous data objects, and for which relationships are described. These relationships are defined by direct memory references.

Persistence: Primary memory, such as random-access computer memory (e.g., RAM), is normally allocated and made available to a running program in such a fashion that once a first program terminates, the memory is allocated to, for instance, a second program, and the contents of the memory lost. Thus, should the first program be restarted, the same memory is no longer available to the program, and must be reallocated. However, the memory will most likely not have the same contents any longer. In fact, most operating systems take care to make sure that it does not, so that the several programs operating on the computer will not mistakenly rely on memory retaining its contents between invocations. Most secondary memory devices, however, including mass storage devices such as hard disks or tapes, do not have this property.

Secondary memory devices (e.g.: "mass storage devices") are often referred to as persistent memory, and are consistently used by all but the most trivial programs to store data from invocation to invocation. The system of the present invention is not such a trivial program; neither are most compilation systems. Current compilation systems typically store only the end result of compilation in this mass storage in the form of linkable object files and other auxiliary files. The system of the present invention stores not only the end result of the compilation process in the form of IL symbols and code objects, but many of the intermediate data structures as well.

Intermediate Language: The system of the present invention internally processes the program definition by compiling one program unit at a time, hereby producing a heterogeneous data structure herein referred to as 'intermediate language' (IL). This language is better suited than source text for internal manipulations such as optimization and machine-code generation.

According to the present invention, there are two major groups of IL data structures: symbols and operators. The latter are used to describe function definitions and initial values of variables. The former are used to describe declarations of both functions and variables.

Intermediate language operators are either expressions that represent values or instructions that represent imperative operations. For example, "integer add" is an expression and "assign" is an instruction.

Code Objects: A code object represents a function or data definition as a sequence of bytes in the form required by the CPU architecture of the target processor. A code object includes a set of relocations, each of which specifies that a pointer value within the code object must point to the code object that is the definition of a specific IL symbol in order to load the code object as part of an executable program.

In the system of the present invention, code objects and intermediate language symbols are stored in persistent memory as a persistent symbol table. There is one persistent symbol table for the entire program. Code objects refer to IL symbols by direct memory reference as opposed to by name or by Id. This again, has significant performance advantages over both traditional systems and the incremental technology previously discussed. Since the system of the present invention utilizes direct memory references as the code objects are formed, no linking process is necessary. The system of the present invention therefore performs linking as a by-product of compilation, thereby eliminating the linker entirely.

Executable Files: An executable file is a complete representation of a translated program, with all references between code objects resolved, and in a form expected by the underlying CPU architecture and operating system. In other words, an executable file is a persistent representation of the program itself, rather than its data. This is typically what a traditional linker or an incremental linker produces. In the system of the present invention, once program editing is complete, the developer causes execution of an extractor which produces an executable file. This extractor therefore performs some of the same functions as the separate linker taught in the prior art.

Extractor: A traditional linker collects object files into an internal data structure. Thereafter, the linker traverses the data structure to generate an executable file. In contrast, the extractor of the present invention performs essentially the same function and operates in essentially the same way as the second phase of a traditional linker, except that the inputs to the extractor are code objects and IL symbols, as opposed to object files.

Program Loader: A program loader is a special functionality of most operating systems that brings an executable file into primary memory, and starts the program under development. This functionality is typically provided by the operating system, and is leveraged by the system of the present invention as well as other compilation systems.

The system of the present invention embodies the program under development in a proprietary executable format, and not in a file for reasons which will be later explained. To load a program in this proprietary format, the system of the present invention further includes a program element referred to as the Runner, which operates in conjunction with the Imager taught herein to perform the loading function. Here, the proprietary executable format and its corresponding loader are used only when a program is being developed. When it is desired to deploy the finished program, the predefined executable format appropriate to the target architecture (e.g. as an ".EXE" file) and the program loader supplied with the corresponding operating system are used.

Processes: In most modem operating systems, including all operating systems to which the system of the present invention applies, each program executes in what is commonly referred to as its own 'process.' A process has three major properties: a program image, which defines the paths of execution of the program; an entry point, which is the location in the program's image where execution is to begin; and an address space, which is a range of memory locations that are unique for that process, and not accessible to other processes.

If different processes, which are running either at the same time or in sequence, need to share some data, this is normally done using files, as discussed above. Persistent storage files are not necessarily unique to one program. Two simultaneous processes may access the same persistent storage at the same time, manipulating the data stored therein to share information.

Shared Memory: Modem operating systems including, by way of example but not limitation, Unix and Windows NT/Windows 95 have another means of sharing data by sharing primary memory. This concept is commonly referred to as 'shared memory.' The system of the present invention places the executable image in shared memory rather than in a file. The proprietary program loader taught herein can not only set itself up to share memory with the compilation system, but can locate the process entry point at a specified location in shared memory instead of in an image file.

Run-time Code Objects: As previously discussed, code objects are stored persistently, and are used to form the program image. References between code objects are not in a form suitable for execution on computer hardware. These references must therefore be translated again. In order not to have to modify the code objects for the purpose of forming a runnable program image, and then have to restore to the code objects their original contents, this invention makes copies of them in non-persistent memory, where the program image is formed. These non-persistent code objects are termed run-time code objects.

Each run-time code object for a function definition has one instruction more than the corresponding code object, an instruction which is non-essential to the program itself, but very essential to the incremental build process. At the beginning of such runn-time code object, a branch instruction is written therein that initially branches to the next instruction, which is the first instruction of the function itself. Thus, the instruction does not affect the program logic at all. When the run-time code object is updated by compiling a new definition for the corresponding function, the new code object is either copied into the same run-time code object as the first, or, if it does not fit, or if an activation of the first run-time code object exists, copied into another run-time code object. If the latter is the case, the branch instruction in the first run-time code object is modified to branch to the first instruction (also a branch instruction) of the new run-time code object. This ensures that all saved references to the old run-time code object are still valid, since after branching there, the program will immediately branch to the new run-time code object.

Incremental Imager: To form the program image in shared memory, the system of the present invention uses something referred to herein as an incremental imager. This takes code objects, copies them into run-time code objects, which are placed in shared memory, and links them together forming a program image which is ready to execute. Rather than having the program loader be passively waiting for the image to be complete, and then load it, the program loader of the present invention takes an active part in the image building process.

Debugger: The term 'debugger' traditionally refers to a program that is used to control the execution of another program, in its own process. It derives its name from the fact that it is used to rid a program of its errors or "bugs." In traditional compilation systems, the compiler translates source text into object files, which are linked together into an executable image file by a linker. The compiler and the linker are independent programs and each execute in different processes. The program is then either run directly by the program loader, or by the program loader under the control of a debugger. Once a bug is found, the program is terminated by the debugger, the source text can then be modified or edited by the developer, and the process starts all over. The reason that the program has to terminate is that normal program loaders don't allow the image file to be modified while it's in use by a process.

In the system of the present invention the incremental builder performs the tasks of the compiler and most of the duties of the linker. The incremental builder, the incremental imager, and the debugger all execute in the same process, and the program loader of the present invention allows the image, which is not in a file, to be modified without having to terminate the program.

Thus, the incremental builder of the present invention significantly reduces the time required to fix a program failure by reducing compilation time and eliminating the time to perform linking, loading (since the image is built in shared memory), and error state recreation time (since the program does not have to be restarted, but can sit waiting in the error state until the fix is in place). Once the fix is effected, program execution continues as though the error had never existed.

Figure 1B:
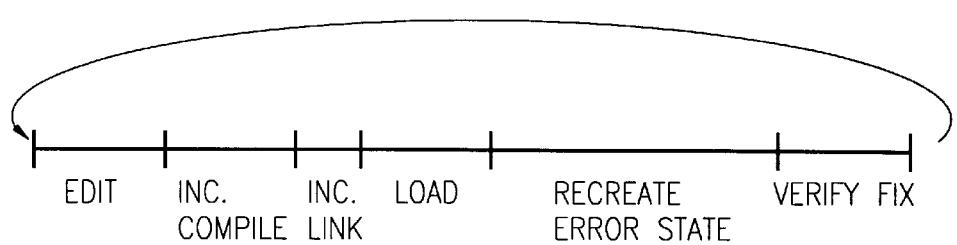
Figure 1C:
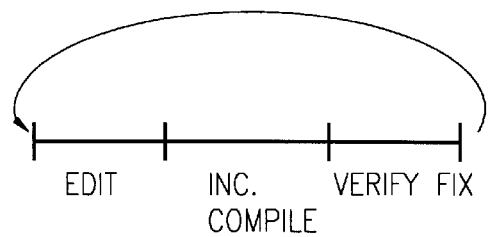

A time-line comparison of the advantages presented by the system of the present invention is shown at FIG. 1. Prior art systems require that the executable image be kept in a file that cannot be modified (updated) while the program process is still "live". This requires therefore that in order to effect any changes to the system, it must be stopped and restarted to effect program updates. The system of the present invention, on the other hand, does not place the executable image in a file, but in shared, mapped memory. The image is thus made available for simultaneous manipulation (by the Imager) and execution (by the Runner).

Figure 2A:
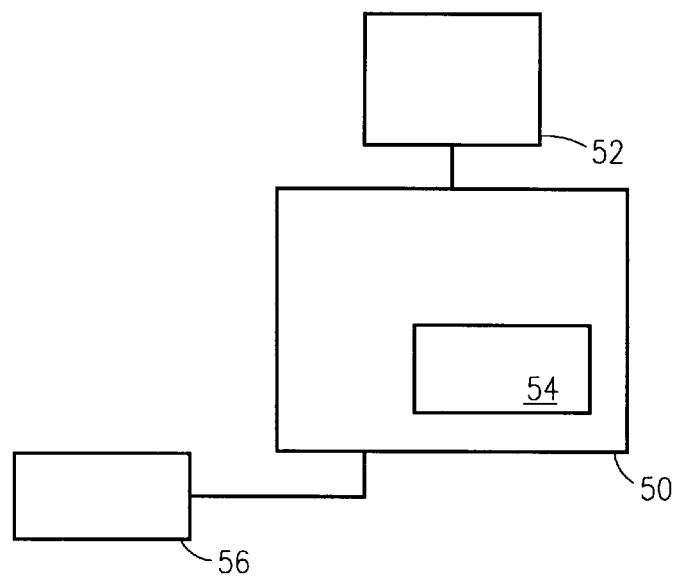
FIG. 2A is a block diagram of a computer system on which this software development system of the present invention operates.

As shown in FIG. 2A, the system of the present invention operates on CPU 50, display monitor 52, memory system 54 and input device 56. CPU 50 preferably is an Intel Pentium; display 52 preferably is a Super-VGA Monitor; memory 54 preferably includes DRAM and magnetic disk storage; and input device 56 includes both a keyboard and a mouse and related interface subsystems.

Figure 2B:
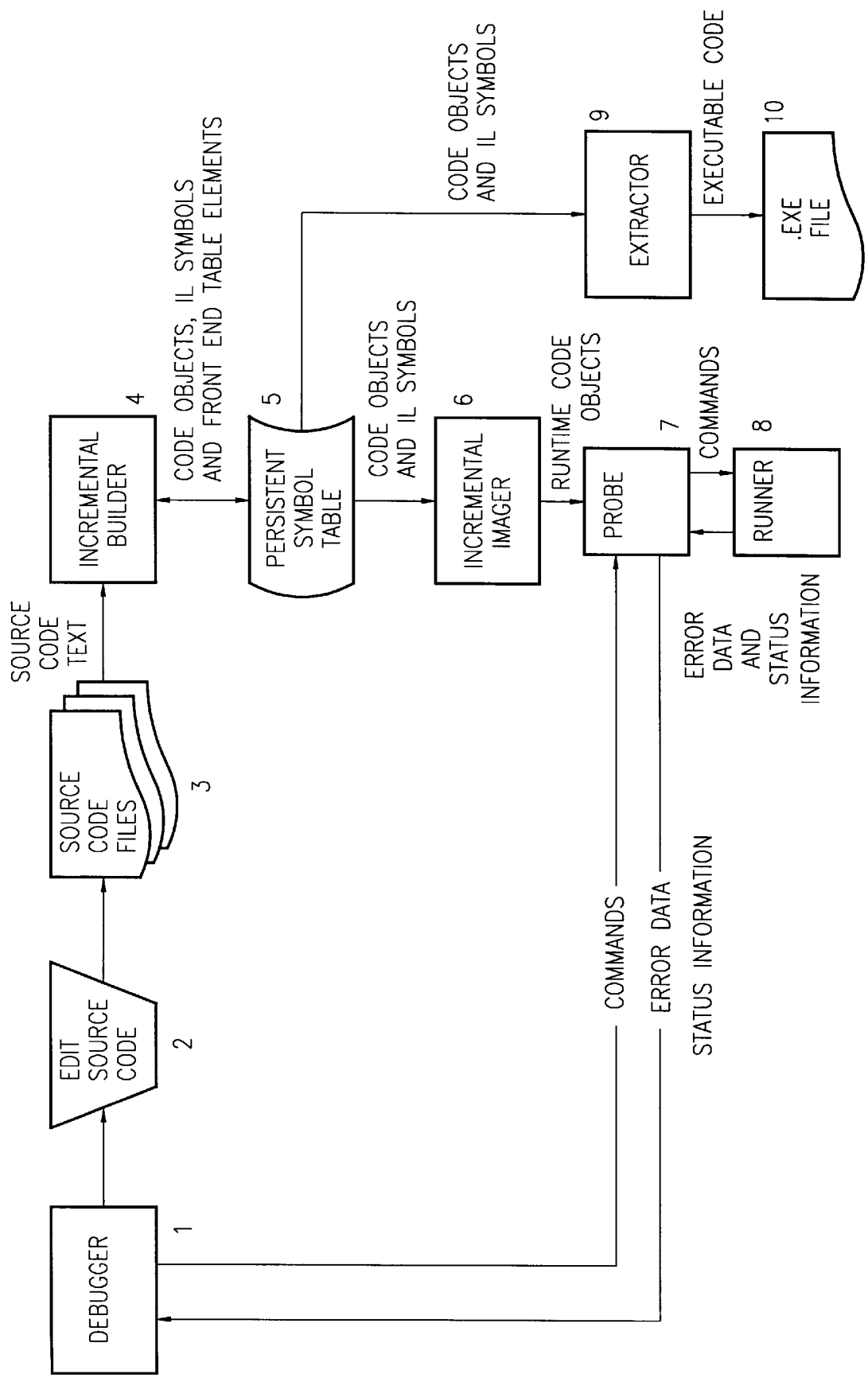
FIG. 2B is a flow diagram of the software development system of the present invention.

Referring now to FIG. 2B, an overview of the program of the present invention is shown. When a developer invokes debugger 1 for the first time for a given set of source code files 3, the incremental builder 4 is invoked which translates source code files 3 into code objects and their corresponding IL symbols. The code objects and IL symbols are stored in a persistent symbol table 5. Persistent symbol table 5 may be implemented in any type of memory device. An incremental imager 6 utilizes the code objects and IL symbols to form run-time code objects. Incremental imager 6 then links together run-time code objects forming a program image which is executable. The actions of the imager and the program are coordinated through a probe 7 and a runner 8. The probe 7 executes in the incremental imager process and the runner 8 executes in the process of the built program. Thus, the image and the program are executed simultaneously in two separate threads of execution using memory-mapped data.

A principal aim of the incremental builder of the present invention is to minimize the compilation effort and time required to construct a complete compiled representation of a computer program after a change to the program's source text, without requiring a specialized representation of program source (e.g.: program source text implemented as database objects) or excessive overhead in initial compilation. These shortcomings are evident in the inventions taught for instance by WO 95/00901 and WO 95/00904. The system collectively taught therein requires that program source text be implemented as database objects. Furthermore, while these and other previously developed incremental compilers may provide advantages in recompilation, they are slow when building an entire program using very complicated internal structures and they limit the use of a number of desirable tools that operate on source files. In contrast, the incremental builder of the present invention accomplishes its principal aim by a process referred to hereinafter as minimal recompilation. Because the incremental builder of the present invention does not utilize source text implemented as database objects, it is capable of much faster initial building than previous incremental compilers. Furthermore, on rebuilding a program, its use of pointers as opposed to database object Ids results in faster incremental rebuilds.

Program source text typically specifies an interface, an implementation, or both. An interface specifies the behavior of one part of a program so that it can be used by another. An implementation provides the specified behavior. Most programming languages provide a way of making interfaces accessible to separately-compiled source. The principles of the present invention are applicable to the compilation of any computer programming language with a facility for logically including interfaces specified in one compilation into another. This facility is termed named-translation inclusion, and is included in many programming languages. By way of illustration but not limitation such languages include Ada, Modula-3, and Java. One feature of the present invention is that it adds named-translation inclusion to the C++ programming language.

Standard C++ uses lexical file inclusion. This means that source code to be included in more than one compilation is compiled as a part of each such compilation. Clever C++ implementations can reuse the results of compiling a set of lexically-included files in several compilations, but must completely recompile the entire set if any one lexically-included file changes.

As taught herein, minimal recompilation may be broadly said to incorporate the following principles:

(a) Dividing source files into relatively small pieces, termed herein program units. These small file pieces enable simple, fast recompilation.

(b) Keeping track of the dependencies which program units have on even smaller component pieces, termed herein program objects. Program units are said to be dependent on program objects to which they refer.

(c) Quickly determining, after recompilation of a portion of a program, which program objects have logically changed and, therefore, which dependent program units need to be recompiled.

A partial ordering orders groups of entities, allowing any order within a group. A preferred embodiment of the present invention employs a partial compilation order for source files—typically, several files can be compiled simultaneously—and so can effectively utilize all available processors in a multiprocessing computer.

Selected properties of program objects are shown at FIG. 3. Each ProgramObject P has the following properties:

A Dependents set, which contains the ProgramUnits whose compilations depend on the ProgramObject.

An encoding of the meaning of the ProgramObject, termed herein a Signature. A Signature, in a preferred embodiment of the present invention, is a 64-bit hashing of a string representing the logical properties of the ProgramObject. The possibility of two different strings hashing to the same Signature is sufficiently unlikely as to be statistically insignificant. A pseudocode representation of one signature creation methodology is as follows:

---

Signature Creation:
  Construct a text string representing an encoding of significant logical properties;
  Hash text string;
End.

---

For example: consider the program object created for the data member X declared in source file A according to Figure X declared here:

```
class C {
  int X;
};
```

The logical properties of X are that it is named "X", it is a data member of class "C", it is of type signed int, it has an offset of zero, and has a protection of private. One possible encoding of these properties is the string: "XprivatesignedintCdata0". A much more compact representation is both possible and desirable. By way of illustration, but not limitation, in a preferred embodiment of the present invention, an encoding of the properties of this data member is representable as: "XpSICD0".

By way of illustration, but not limitation, for the C++ programming language, each of the following constitutes a program object:

An entire (lexically-included) source file;

A macro;

A tag, function, typedef, template or variable declared at namespace-scope;

An enumerator; and

A tag, function, typedef, or data member of a class.

Each program object is contained by a program unit. As previously discussed, a program unit is the smallest entity which is compiled at one time by a preferred embodiment of the present invention. Different programming languages may impose differing structures which require the formation of program units.

In the general case, the following constitute program units:

Entire files; and

Syntactic declarations not contained within other syntactic declarations.

By way of illustration, but not limitation, in the C++ programming language each of the following constitutes a program unit:

An entire file;

A file scope declaration; or

A namespace scope declaration.

One of the requirements of the Incremental Builder of the present invention is to recognize all program objects. For each program object, the builder creates an internal representation of the program object called a ProgramObject and associates it with an internal representation of the containing program unit called the ProgramUnit object of the containing program unit.

Selected properties of a generic program unit are shown at FIG. 4. It should be noted that, in a preferred embodiment of the present invention, Program Units may be further classed as either DeclarationProgramUnits or SourceFileProgramUnits. Each ProgramUnit has the following properties:

A RequiresCompilation flag, which can have the value true or false.

A DependsOn set, which contains the ProgramObjects used in the compilation of the ProgramUnit.

Referring now to FIG. 5, the additional properties of a Declaration-ProgramUnit include a list of the ProgramObjects contained in the Declaration-ProgramUnit.

Having reference to FIG. 6, the additional properties of a SourceFileProgramUnit include:

A list of the Macros contained in the SourceFileProgramUnit; and

A list of the DeclarationProgramUnits which it contains.

Program source text consists of separately-compilable text files (source files) which may be edited by any text editor. A source file that specifies interfaces usable by other source files defines a named translation. A source file that uses interfaces specified by other source files includes the relevant named translations (by name) in its compilation. For each compiled source file, the incremental builder of a preferred embodiment of the present invention creates a Translation. This translation is named or unnamed as appropriate.

Including a translation in a compilation recursively includes all translations included in the compilation of the translation. A source file A defining translation AA must be compiled before source file B if the compilation of B includes AA. This rule defines a partial compilation order for the source files of a program. Any set of source files whose compilations are not ordered by this rule can be compiled in any order or simultaneously.

Within a source file, the syntactic elements are built in the order specified by the programming language definition. For the C++ programming language, this corresponds to the lexical ordering of the source text.

For the initial building of a source code file every SourceFileProgramUnit requires building. The incremental builder builds the source file represented by each SourceFileProgramUnit in an order that obeys the partial build order, stopping when no unbuilt source files that don't include unbuilt named Translations remain. For each source file that builds without error, the program builder marks the corresponding SourceFileProgramUnit as not requiring building. Every DeclarationProgramUnit in each such SourceFileProgramUnit is marked as not requiring building.

When a source file has been modified, e.g., following editing during the debugging process, the incremental builder of a preferred embodiment of the present invention rebuilds only those program units whose source text is edited or that depend on one or more program objects whose logical properties have changed. This is done by marking the SourceFileProgramUnit of each source file whose text has changed (or that lexically includes a source file whose text has changed) as requiring compilation. This is done by setting the Requires Compilation flag to true. The incremental builder then traverses all SourceFileProgramUnits in compilation order. For each SourceFileProgamUnit:

1. If the SourceFileProgramUnit needs building, it is rebuilt in its entirety.

2. Otherwise, the compiler traverses all DeclarationProgramUnits in the SourceFileProgramUnit in lexical order. Each DeclarationProgramUnit that needs compilation is recompiled.

The following steps are performed when rebuilding a Source File Program Unit:

1. For each Declaration Program Unit in the Source File Program Unit SF1, delete the Declaration Program Unit from the Dependents set of each element of its DependsOn set, and then discard its DependsOn set.

2. Compile the text of the source file to produce a new SourceFileProgramUnit SF2 (and a new Translation).

3. Construct a table T containing all of the ProgramObjects in all the ProgramUnits in SF2, indexed by Signature.

4. Traverse the Program Objects in SF1. (This requires traversing the list of DeclarationProgramUnits.) For each Program Object O, look up O's Signature in T. If an entry O1 exists, copy each element of O's Dependents set to O1's Dependents set and delete O1 from T. If an entry does not exist, mark each element of O's Dependents set as needing rebuilding by setting the RequiresCompilation flag to True.

5. If step 2 did not determine any portion of the declaration to contain malformed source code, mark the Declaration Program Unit as not needing building.

The rebuilding of a Declaration Program Unit is accomplished as follows:

1. Delete the Declaration Program Unit from the Dependents set of each element of its Depends On set, and then clear the Depends On set.
2. Compile the text of the Declaration Program Unit to produce a list of Program Objects.
3. Construct a table T containing all of the new Program Objects, indexed by Signature.
4. Traverse the list of the old Program Objects. For each Program Object O, look up O's Signature in T. If an entry O1 exists, copy O's Dependents set to O1 and delete O1 from T. If an entry does not exist, mark each element of O's Dependents set as needing recompilation.
5. Replace the old list of Program Objects with the new one.
6. If step 2 did not determine any portion of the declaration to contain malformed source code, mark the Declaration Program Unit as not needing building. The process for the creation of Program Units, Program Objects, IL Symbols and Code Objects may be represented in pseudocode form as follows:

is defined to return the result of invoking Fred for the C object for which Barney is invoked.

FIG. 9 represents a modification to source file A previously shown at FIG. 7, wherein the source file is modified during editing. In this example, the declared type of X, which type was heretofore integer, is changed to floating point. The textual definitions of Fred and Barney remain unchanged.

Figure 10:
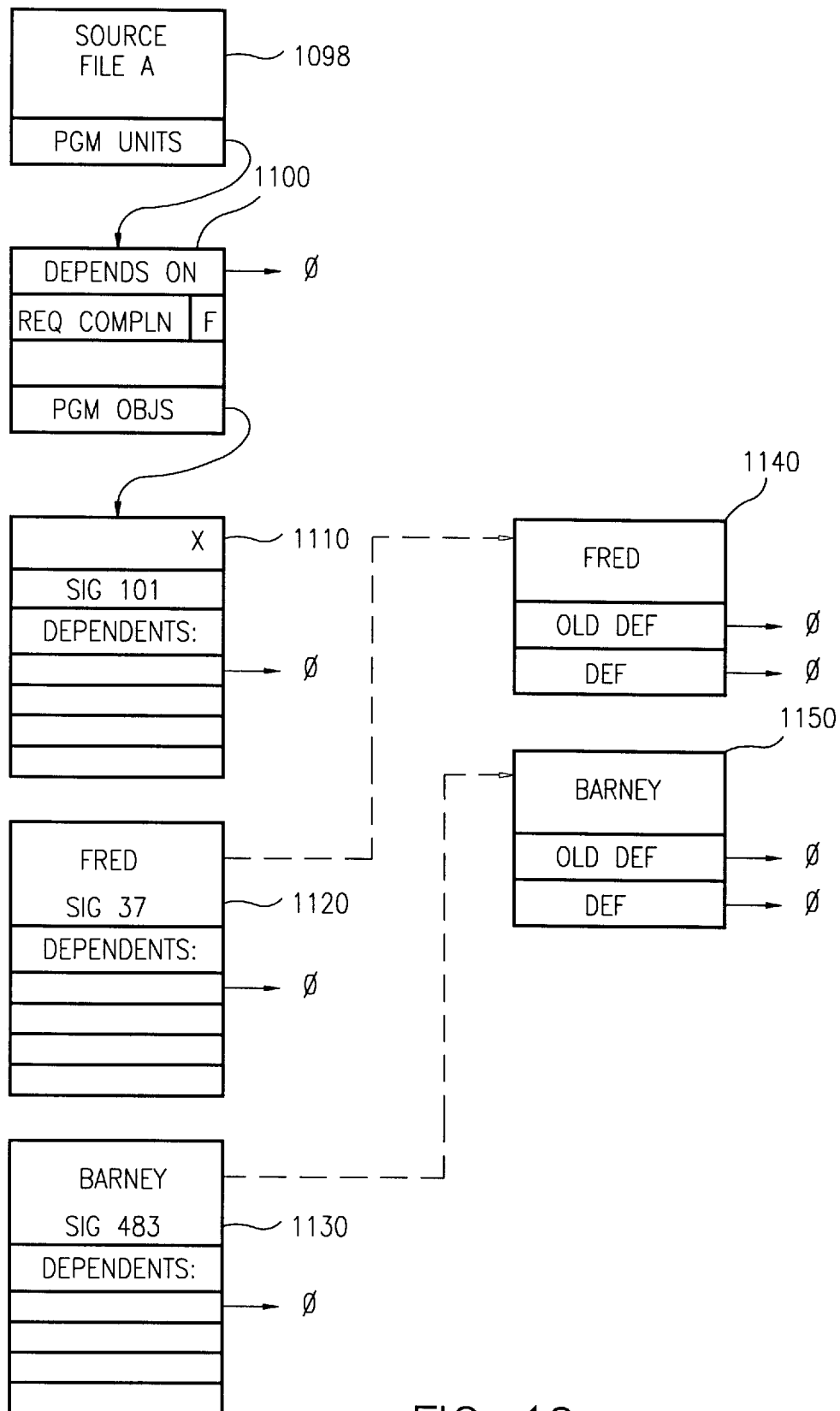
FIG. 10 is a diagram illustrating the incremental building of a program unit, program objects and IL symbols responsive to source file A.

Referring now to FIG. 10, the compilation of source file A, 1098, is shown. The building of source file A, 1098, generates a first program unit 1100. Program unit 100 represents the smallest individually compilable element contained within source file A, 1098. The creation of program unit 100 causes the creation of program objects 1110, 1120, and 1130. Program object 1110 represents the declaration of data member X and contains a signature, in this example 101, and a dependents set, whose initial state is empty. The declaration for the function Fred is embodied in program object 1120 also has a signature, in this example 37, and a dependents set which is initially empty. Because program object 1120 represents a function declaration, it will result in the creation of an IL symbol. Accordingly, the pointer in the IL symbol field in program object 1120 is set to point to IL symbol 1140. IL symbol 1140 contains pointers to an old definition and a new definition both of which are, at this time, set to null.

In similar fashion, the function declaration for the function Barney results in the creation of program object 1130 which, in this example, has a signature value of 483, and a dependents set which is initially empty.

In summary, the building of source file A has resulted in the creation of one program unit which causes the creation

```
Parse program text, identifying file-scope or namespace-scope syntactic declarations, and generating an
abstract syntax tree (AST) for each such declaration;
  Do for each AST:
    Create a Program Unit U;
    Perform semantic analysis of AST as follows;
      Create symbol table nodes, including ProgramObjects that represent
      entities in U for which recompilation dependencies are meaningful;
      Recognize dependencies on existing ProgramObjects;
      Do for each depended-upon Program Object PO:
        Add PO to U's DependsOn set;
      End do;
      Do for each function (or static-storage datum) FD declared in U:
        If FD does not have an IL symbol, create one for it.
        If the AST defines FD, generate IL to represent the definition
        and then perform code
generation on the IL to produce a code object.
      End do;
    End perform;
  End do;
End.
```

Figure 11A:
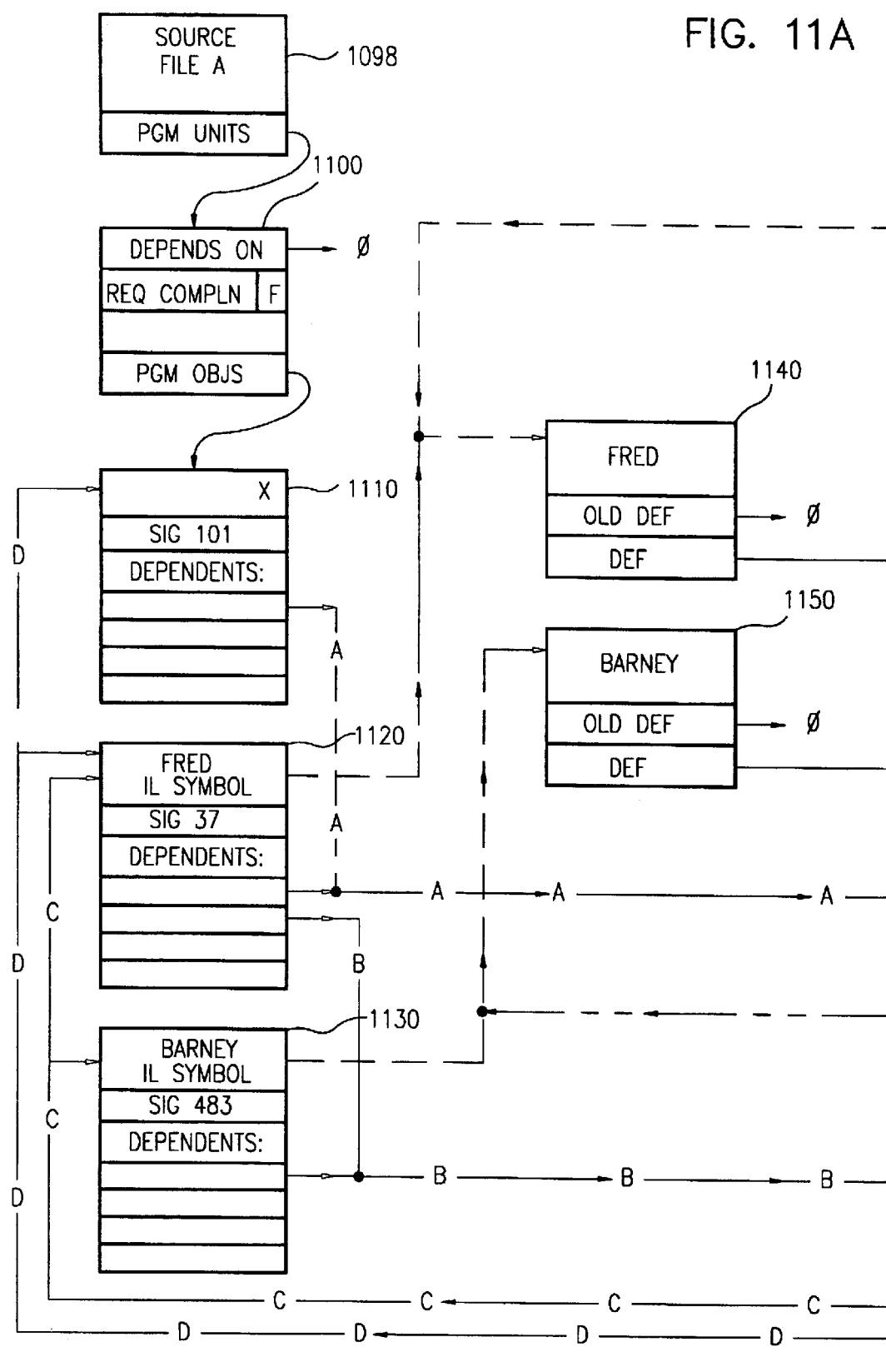
FIG. 11 is a diagram illustrating the incremental building of program units, program objects, IL symbols and code objects responsive to source file B subsequent to the incremental building of source file A.
Figure 11B:
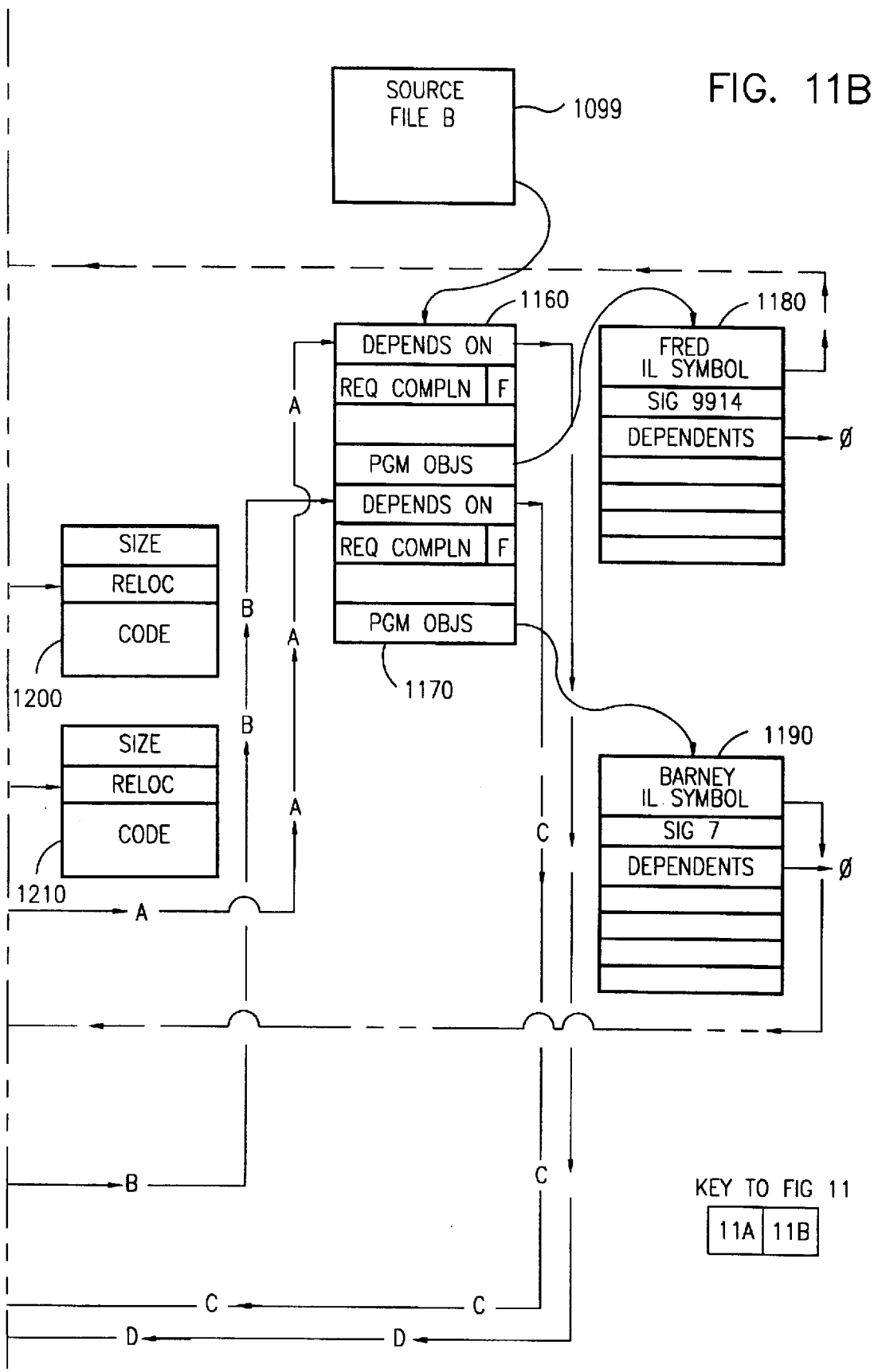
Figure 12A:
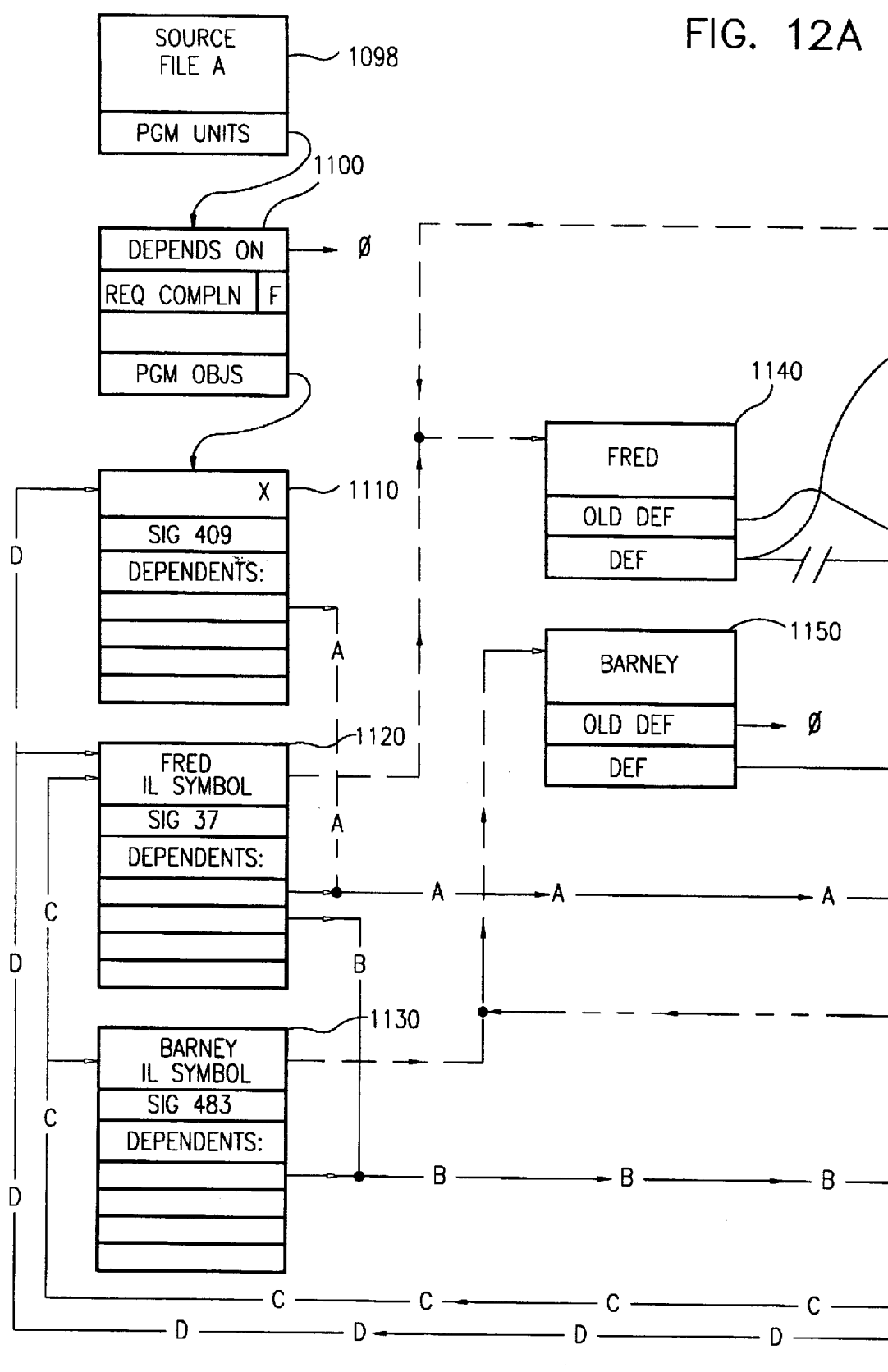
FIG. 12 is a diagram illustrating the incremental re-building of affected program units, program objects, IL symbols and code objects responsive to modification of source file A.
Figure 12B:
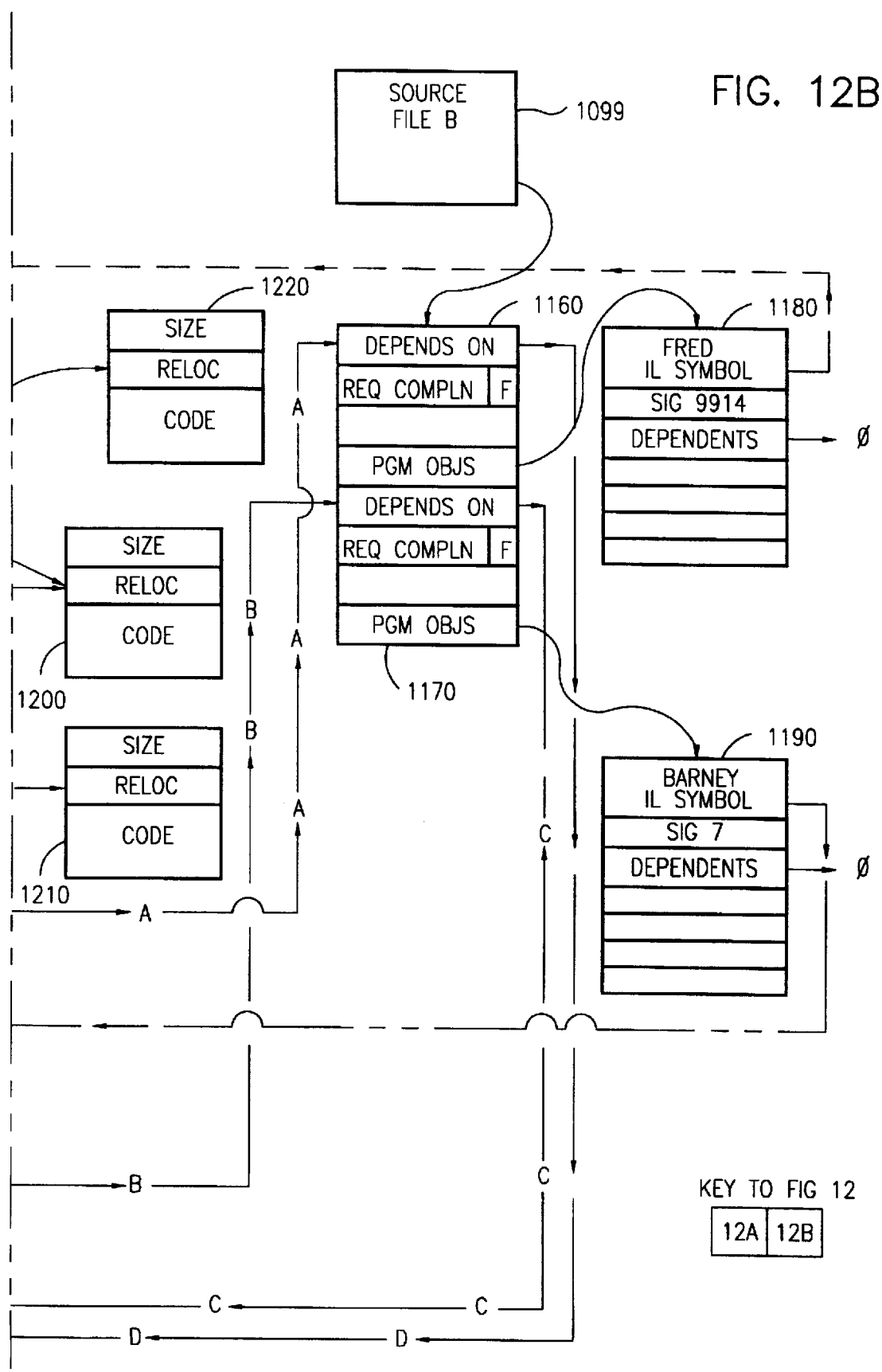

Referring now to FIGS. 7 through 12, an exemplar demonstrating the principles of the incremental builder of the present invention, as previously discussed is shown. These source text examples are written in the C++ programming language. The signature values that appear in FIGS. 10, 11 and 12 are arbitrary and not derived using any algorithm.

Having reference to FIG. 7, a first source file A, 1098, declares class C and declares data member X to be of type integer and declares member functions Fred and Barney to take no arguments and return an integer.

Having reference to FIG. 8, a second source file B is shown. Source file B defines the functions Fred and Barney. Function Fred is defined to return the value of the X member of the C object for which Fred is invoked. Function Barney of three program objects. The program objects which declare functions result in the creation of IL symbols. Program objects which are declarations of data members do not result in the formation of IL symbols.

Referring now to FIG. 11, the building of source file B, 1099, results in the creation of two program units 1160 and 1170. Program unit 1160 represents the syntactic definition of the function Fred, previously shown in FIG. 8. Program unit 1170 represents the syntactic definition of the function Barney also shown in source file B.

Having continued reference to FIG. 11, in this example, program units 1160 and 1170 each create one program object, 1180 and 1190 respectively, and the pointers defined in the program objects field of program units 1160 and 1170 point to program objects 1180 and 1190. Program object 1180 is the program object representing the definition of the function Fred previously declared by program object 1120, and as such points to IL symbol 1140 which, it will be recalled, was created responsive to the declaration of the function Fred by program object 1120. In similar fashion, program object 1190 represents the definition of the function Barney previously declared by program object 1130, and again program objects 1130 and 1190 each contain pointers to the IL symbol 1150 for the function Barney. This is important to note in that this is the mechanism whereby the present invention achieves linking during the process of compilation. This feature takes advantage of a function commonly found in most compilation systems, that of creating a unique intermediate language symbol to represent one function or piece of static data. Because, however, the present invention is able to track the symbol table across compilation units, it is possible to have one IL symbol for a given function in all compilation units and, therefore, no separate linker is required.

In forming program unit 1160, the incremental builder detects dependencies on program objects 1110 and 1120. Accordingly, the depends-on set of program unit 1160 includes pointers to program objects 1110 and 1120 (as shown along pointer line D), and the dependents sets of 1110 and 1120 are each augmented to include a pointer to program unit 1160. In similar fashion, program unit 1170 depends on program objects 1120 and 1130. Accordingly, the depends-on set of program unit 1170 includes pointers to program objects 1120 and 1130 (as shown along pointer line C), and the dependents sets of 1120 and 1130 are each augmented to include a pointer to program unit 1170.

Summarizing the actions to this point in system execution, data member X has been declared and the functions Fred and Barney have been declared and defined. Accordingly, the definition fields of IL symbols 1140 and 1150, previously null, are now set to point to code objects 1200 and 1210 respectively. Code objects 1200 and 1210 are created as the definitions of Fred and Barney, respectively.

At this point the incremental builder of the present invention has built, from source files A and B, the IL symbols and code objects necessary to form the program image of this program. The IL symbols and code objects are stored in the persistent symbol table.

Referring now to FIG. 12, the effects of editing one of the source files of the program is shown. Having again reference to FIG. 9, it will be recalled that source file A was amended therein to change the type of data member X from integer to floating point. In traditional compiler technology, this change would require the recompilation of all the code in the program, including source files A and B. However, one of the advantages of the present invention is that of requiring only the rebuilding of those program units which have been edited or which depend on program objects that have changed meaning.

In FIG. 12 the results of the editing formed in FIG. 9 are shown. The change to data member X to be of type floating point requires that the data member declaration contained in FIG. 7 be updated as shown in FIG. 9. This results in the rebuilding of program unit 1100 and program objects 1110, 1120, and 1130. Accordingly, those elements are rebuilt at this time. It is important to note that program unit 1100 itself, as well as program objects 1120 and 1130 remain unchanged as a result of changing the type of data member X. Accordingly, while a new program unit 1100 and program objects 1120 are thus formed during the rebuild process, they are identical to their previous values. Program object 1110, however, has changed to reflect the new type of the data member X. Accordingly, program object 1110 generates a new signature now shown to be of value 409. IL symbol 1150 remains unchanged. Because program object 1110 is not rebuilt with an identical signature, each program unit in its dependents set must be rebuilt. Therefore, program unit 1160 is rebuilt, which causes program object 1180 to be rebuilt and code object 1220 to be created.

IL symbol 1140 is updated as follows: its old-definition field is set to the prior value of its definition field (i.e. to point to code object 1200) and its definition field is set to point to code object 1220. Program unit 1170 and program object 1190 are not rebuilt. After program object 1180 is rebuilt, IL symbol 1140 is updated as follows: the definition pointer is changed from the relocations field of code object 1200 to the relocations field of new code object 1220 which contains the updated object code. Similarly, the old definition field of IL symbol 1140 is reset from the null value to the relocation value of the previously defined code object 1200. All program objects, program units, IL symbols, and code objects are stored in the previously discussed persistent symbol table implemented in a database further implemented in a memory device. For reasons of system efficiency, an object oriented database is utilized in a preferred embodiment of the present invention.

With respect to FIGS. 10–12, the Dependents field of the program objects (e.g., 1110) and the depends on field of the program units (e.g., 1160) are implemented, in a preferred embodiment, as a binary tree of pointers arranged for efficient sorting. For the sake of clarity in these figures, the actual list of pointers, and the several pointers referred to therein, have been omitted from the figure elements representing program units. The concept of a field comprising a binary tree of pointers is well known to those of ordinary skill in the art.

The net result of the editing process previously discussed is that IL symbols 1140 and 1150 point to code objects 1220 and 1210 respectively and these IL symbols and code object pairs are now available in the persistent symbol table for use by the incremental imager of the present invention to form and run the program image thereby defined.

In a traditional compilation system, a linker is invoked to take object code in the form of object files and resolve all the references between objects in the object code, and to produce a new, different image using the object files. This new image may represent an entire program (e.g., an executable file) or a self-contained portion of a program. Such a self-contained portion would have no unresolved external references and is often referred to as a dynamic link library, or DLL.

In the system of the present invention the Incremental Imager performs some of these tasks normally performed by a linker. The Incremental Imager performs these tasks not on object files, but on the previously defined Code Objects.

Object code elements are not necessarily placed in the same order or at the same address in the eventual image as they are in the original form. This is intuitively obvious in the case of object files, where addresses of function and data definitions (ex: code objects) are merely their position relative to the beginning of the file. Thus, there is no chance that a definition will ultimately occupy the same position in the executable file as it has in the object file. This is true even if the linker only needs one object file to produce the executable image, since the size of file header information is typically very different between the executable image and the object file.

In the system of the present invention, code objects are copied into runtime code objects by the Imager, and will most definitely not have the same address as the original Code Objects did. Code objects and Runtime Code Objects coexist in the same address space, and must therefore have different addresses.

There is also a significant distinction to be made between the address that a code object has in relation to the beginning of an executable file, and the address that it will have when loaded in memory by the program loader. There is a further distinction in the system taught herein between the address of a runtime code object in the Imager process and that in the Runner process. It is an inherent property of shared memory that the same piece of physical memory does not necessarily have the same logical address in all processes where it is shared. Some, but not all, operating systems do guarantee the sameness of addresses of shared memory blocks. This is not generally done, however, out of concern for the application programmer, but because it is a simplistic implementation of an operating system.

In summary then, there are two kinds of objects to be dealt with when forming an image:
  A. Code Objects, which represent the translated program items in their un-relocated form.
  B. Runtime Code Objects, which represent the translated program items in their relocated form.

Also, from the preceding discussion, there are three categories of object addresses which must be accounted for:
  a. The addresses of Code Objects in the address space of the Imager/Debugger.
  b. The address of Runtime Code Objects in the address space of the Imager/Debugger.
  c. The address of Runtime Code Objects in the address space of the Runner.

In other words, each Code Object T is located at address $T_a$ and its corresponding Runtime Code Object R is located in memory that is found at address $R_b$ by the Imager, and at address $R_c$ by the Runner.

Addresses are normally used by software by the means of pointers (the term used in such programming languages as C, Pascal & C++), or references (used in such languages as Pascal and C++). Both forms simply retain the full, absolute address of an object. While hardware (e.g.: the computer's CPU) also uses addresses, it generally has more complex needs than does software. In order to simplify the logic of the transistors that implement a given hardware architecture, addresses utilized by hardware are formed by a myriad of different schemes, each of which depends on the hardware itself. By way of example, but not limitation, these hardware addresses may be split in two pieces, located in different instructions, or made relative to the address of the instruction that uses the address.

Accordingly, it is seen that there are three consumers of addresses:
  I. The Imager/Debugger which needs to use addresses from categories a and b when writing or reading data in objects (such as Code Objects and Runtime Code Objects).
  II. The Runner which needs to use addresses from category c when writing or reading data in objects (just Runtime Code Objects and their support structures).
  III. The CPU, i.e. the hardware, which needs to use addresses from category c when accessing data, but may often not be able to use them in the same form (pointers) as the Runner software is.

To further complicate this issue, the CPU is not interested in the address of the Runtime Code Object itself, but the address of the translated object code which is contained within it at some offset.

The purpose of the process of code object traversal and relocation in this invention is to establish the necessary set of Runtime Code Objects, establish their addresses $R_b$ and $R_c$, and make them available to consumers II and III (the Runner and the CPU), taking note of the fact that the CPU is really interested in $R_c+k$, where k is the constant (i.e.: the same for all runtime code objects) offset of the translated object code within the runtime code objects.

In the present invention, as in most linker technology, a relocation record is a piece of data that describes what form an address must take at a given point in the program. The form varies not with the referenced address, but with the location where the reference occurs. For example, data items that contain addresses of functions usually need to keep absolute pointers to the function, since the address will likely (but not certainly) be used by software.

The CPU might use absolute addresses when using so-called branch-tables, or when calling to an address that was established dynamically (at runtime) by the program. This is referred to as an indirect reference, since the address referenced is contained in some piece of data that first has to be referenced. The hardware is also likely to use direct addresses when referring to data, but will normally use a more complex form when making a direct reference to functions from other functions. An example would be when implementing a subroutine call.

From the preceding, it is shown that in the present invention the process of relocation is one of translating full addresses of Runtime Code Objects to whatever form is necessary at each point of reference.

Since Code Objects are not that which is actually executed in the system of the present invention as the program image, relocation is performed on Runtime Code Objects only. However, the relocation records are attached to the Code Objects and not the Runtime Code Objects. This is logical, since relocation records are used in forming the complete runtime Code Objects when building the image (either initially or incrementally).

To perform relocation, the Imager iterates over all Code Objects for which a corresponding Runtime Code Object has been created. For each Code Object T, it processes each relocation record L this way:
  1. Note the type (form the address must take when used by the CPU) of relocation L.
  2. Note the offset $O_L$ within T where the reference occurs.
  3. Note the addresses $R_b$ and $R_c$ of the code object that corresponds to T.
  4. Note the address of $S_c$ of the code object that is referred to at $O_L$.
  5. At address $R_b$ place a pointer to $S_c+k$, where k is the constant offset of the translated object code within the runtime code object. If this pointer must be relative to the current location, use $R_e+O_L+k$ as the current location.

The Imager/Debugger not only produces information for the hardware, it also produces information for the Runner. In that process, it need not worry about relocation forms and other complexities, since all the Imager/Debugger needs is to make sure to use addresses from category c whenever it communicates with the Runner. In some circumstances where space is of concern, and it is necessary to avoid duplication of information, the Runner will in fact accept addresses from category b, and itself translate them to category c.

Figure 13:
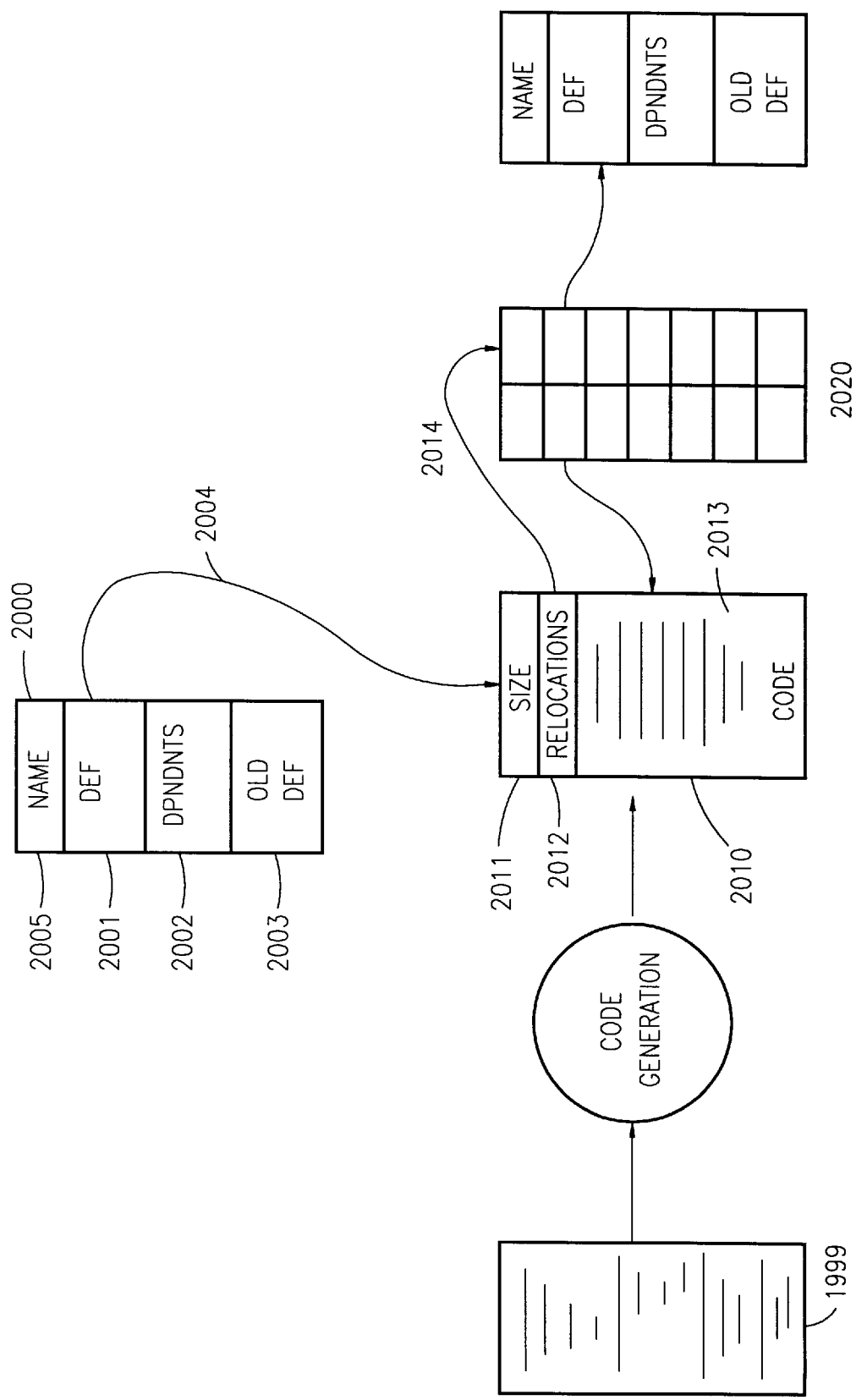
FIG. 13 is a diagram illustrating the use of the code objects and IL symbols in forming the program image.

FIGS. 13 through 17 illustrate a preferred embodiment of incremental image formation according to the principles of the present invention. Referring now to FIG. 13, the use of the code objects and IL symbols in forming the program image is shown. An IL symbol, previously stored in the persistent symbol table, is shown at 2000. Each IL symbol 2000 contains a definition field 2001 which comprises a code object pointer 2004 which points to a corresponding code object 2010 by means of direct memory addressing. Definition field 2001 is defined by IL instruction stream 1999. IL symbol 2000 further comprises a dependents field 2002 and an old definition field 2003. Optionally, IL symbol 2000 further defines an IL name 2005. It is important to note that name 2005 is used only to display information to the programmer, e.g., in debug mode, and is defined during image creation. Each IL symbol 2000 is formed by the incremental builder of the present invention from part of the IL stream 1999.

Code object pointer 2004 points to a code object 2010 corresponding to IL symbol 2000. Each code object 2010 contains a size field 2011, a relocations field 2012 and a code section, 2013. Code sections 2013 contain the previously discussed fully translated machine-language implementations of function definitions and the initial values of variables. Relocations field 2012 defines a relocations pointer 2014, which points to a relocations array 2020. Relocations array 2020 comprises a vector of relocation offsets and IL symbol references.

The IL symbol to which relocations pointer 2014 points may be the same IL symbol which invoked the formation of code object 2010, as in the case of a recursive process, or in the more typical case, may point to a different IL symbol altogether.

The update table is maintained by the Builder for the Imager, so that following editing or other changes to the source file, the Imager can locate the code objects which have changed. This ensures that Imager forms the image according to the newest code objects when updating the image.

Figure 14:
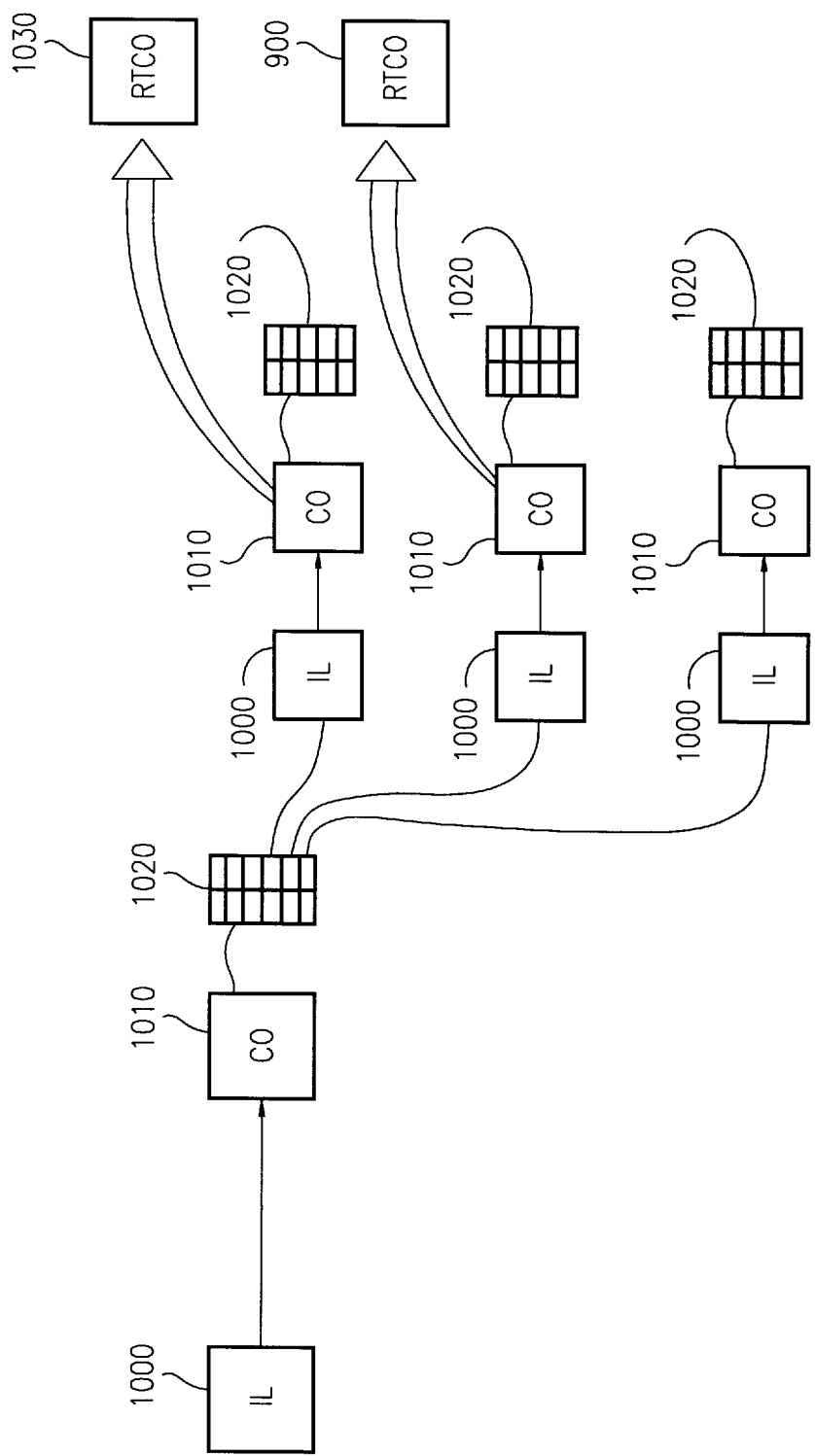
FIG. 14 is a diagrammatic representation of the sequential formation of code objects, relocation arrays and run-time code objects responsive to an IL symbol.

Referring now to FIG. 14, the formation of run-time code objects is discussed. Each IL symbol 1000 causes the formation of a run-time code object 1010. As the Incremental Imager 200 of the present invention continues to analyze code objects 1010, additional IL symbols 1000 are added to the image. Each of these code objects contains a pointer to a relocations table 1020 as previously discussed, which points in turn to an IL symbol 1000, typically of finer granularity, which in turn points to its code object 1010 and so forth. At the point where no more IL symbols 1000 can be added, all the code objects 1020 which define the program have been formed. When all the code objects in the image have been formed, a state of transitive closure is said to exist.

Runtime code objects are copies of code objects having additional scratchpad memory included in their structure, and with references changed to machine dependent forms during relocation. Before copies of the code objects are made, it is necessary to start the probe and the runner. The runtime loader starts prior to copying the code objects to the run-time code objects. This is because the utilization of shared memory requires that the two processes, i.e. the probe and the runner, must agree on memory to be allocated between the two processes. Each run-time code object contains references to two addresses, one for each process.

Figure 15:
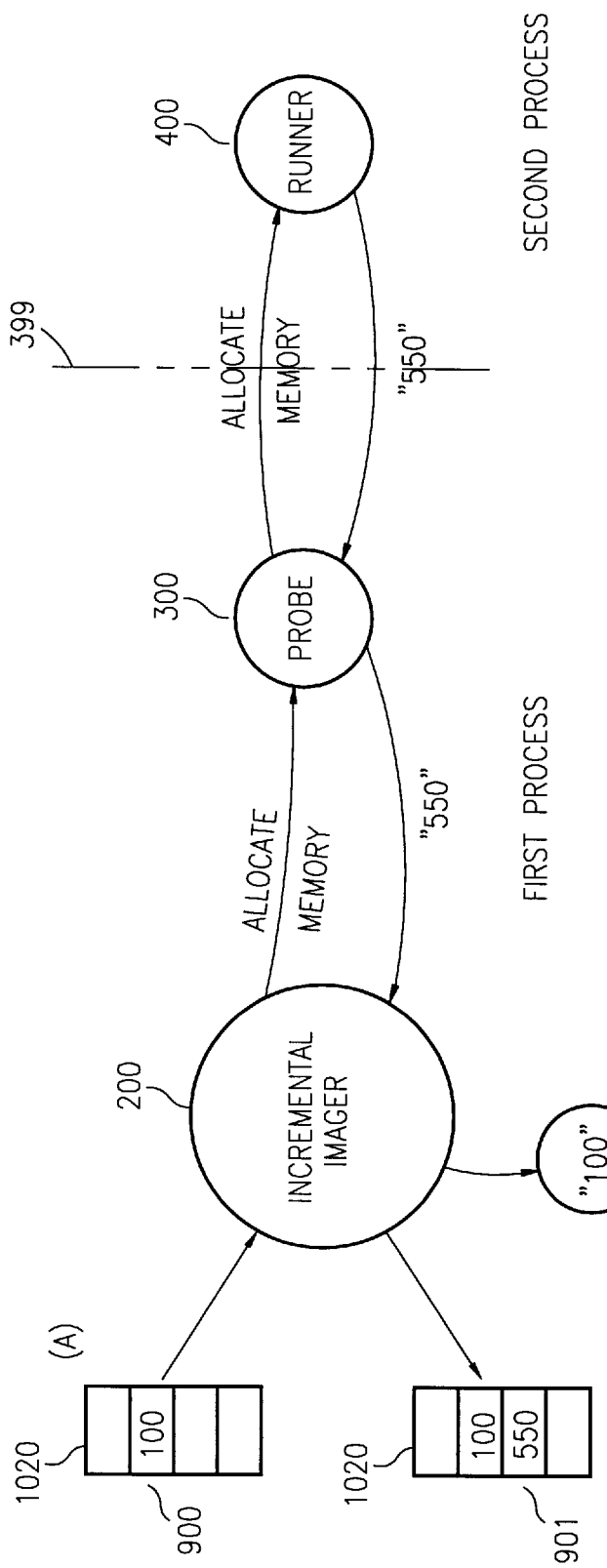
FIG. 15 is a diagrammatic representation of shared memory allocation using the probe and runner.

Referring now to FIG. 15, for each code object 1020 having a persistent address, e.g.: 100, the incremental imager 200 directs probe 300 to allocate memory. Probe 300 then directs runner 400 to allocate memory. It is important to recall that probe 300 and runner 400 are operating tinder two separate threads of execution in two distinct processes, and are logically separated by a process boundary 399. Responsive to the command to allocate memory, runner 400 allocates a machine address. e.g. 550, and returns this address across process boundary 399 to probe 300. Probe 300 passes the address to incremental imager 200 which associates it with the run-time code object.

The probe, in a preferred embodiment of the present invention, is implemented according to the following pseudocode representation:

```
while (true) do
  accept command from
    Imager = >
      Stream data into communication pipe
      send data to Runner
    Runner = >
      Gather streamed data Runner
      send data to Imager
end while
```

The runner in a preferred embodiment of the present invention, is implemented according to the following pseudocode representation:

```
Startup Thread:
  start CommunicationThread
  start ApplicationThread
  wait for ProgramTermination
Application Thread:
  wait for StartApplication
  find program entry point
  execute from program entry point
  send ProgramTermination to StartupThread
  terminate ApplicationThread
Communication Thread:
  terminate - false
  while (not terminate) loop
    accept command from Probe = >
      SUICIDE = >
      terminate=true
      DEFINE ENTRY = >
        set program entry point
      ALLOCATE = >
        allocate a block of shared memory
      DEALLOCATE = >
        de-allocate a block of shared memory
      REMAP = >
        map already allocated block into memory again
      ACTIVATE = >
        perform fixups and initialize static data in program
        send Start Application to Application Thread
      READ MEMORY = >
        send data from runner memory to debugger
      WRITE MEMORY
        write data from debugger into runner memory
    end accept
    send answer data to Probe
  end while
  terminate CommunicationThread
```

Figure 16:
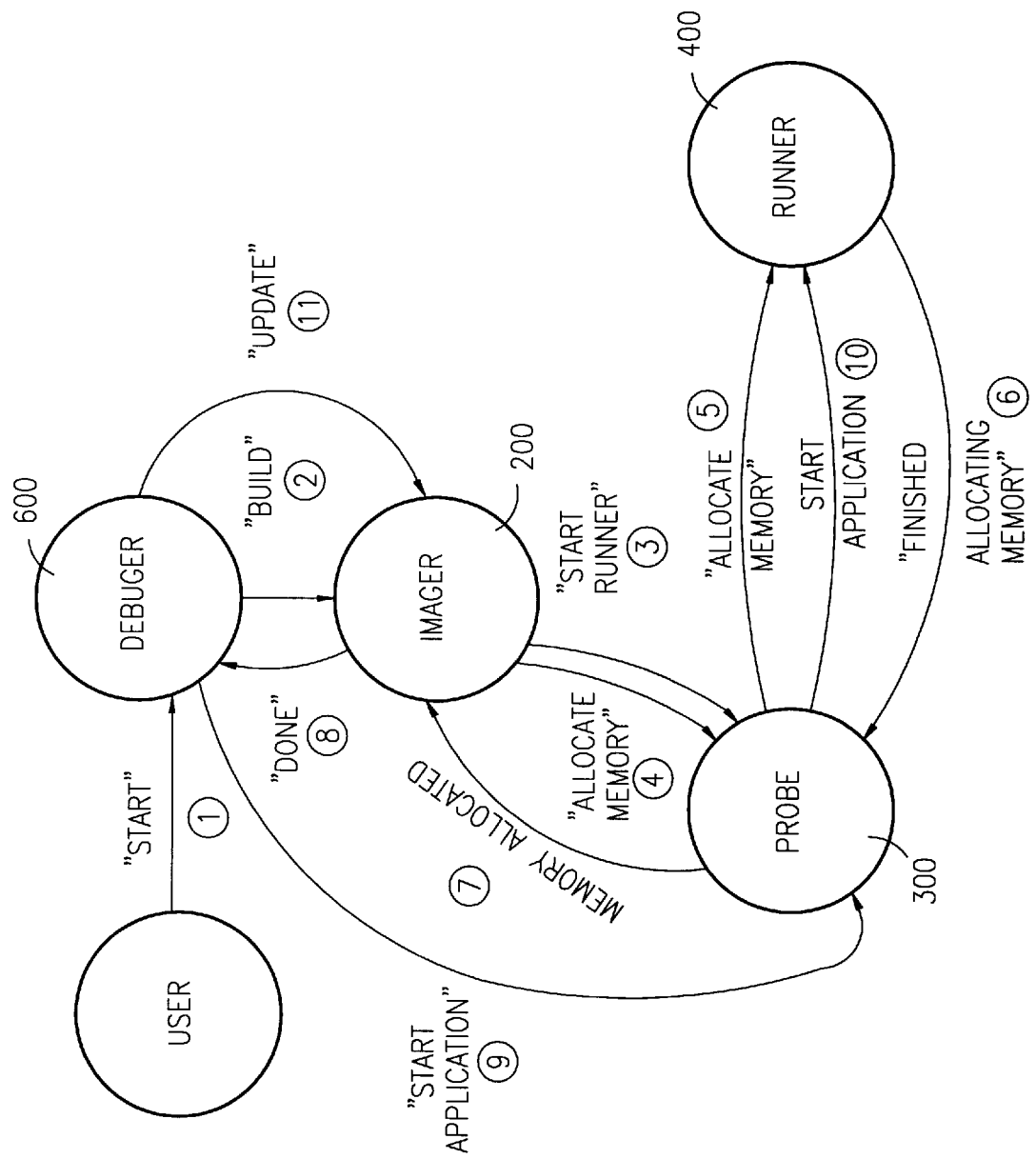
FIG. 16 is a diagrammatic representation of the creation of the run-time image of the program.

To create the run-time image of the program this process is iterated for each code object, as shown in FIG. 16. Having reference to that figure, to create the program image, the developer directs the debugger 600 to start at step 1. Debugger 600 orders imager 200, at step 2, to build as previously discussed. For each code object (not shown), the imager 200 directs the probe 300 to allocate memory at step 4. Probe 300 orders runner 400 to allocate memory at step 5. Runner 400 allocates machine memory, and returns the address to probe 300. Probe 300 returns the address to the imager 200. This causes a request for the next code object to be issued. Steps 2 through 5 are repeated for each code object in the file. When the runner has completed allocating machine memory for the last code object, it informs probe 300 that it has finished allocating memory at 6. Responsively, probe 300 informs imager 200 at 7 that all memory has been allocated. The imager, at 8 informs the debugger at 8 that the build is complete. At this point, the image is completely formed in memory, and the program may be executed.

Having continued reference to FIG. 16, responsive to the receipt by debugger 600 at step 8 that the image is built, debugger 600 orders probe 300 directly, at 9, to start the application. This order is transmitted in turn to runner 400 at 10. This results in the image being executed, the image embodying the program simultaneously in two separate threads of execution using memory-mapped data.

During this process, should the application fail, the computer's operating system reports the failure to the debugger, along with the machine address of the failure and, optionally depending on the operating system, other information relating to the nature of the failure. The debugger translates the machine address to the code address, along with the other failure information, and informs the developer of the failure, its code address and the failure data.

The developer uses this information to edit the source code file. Once the source file is edited, the developer instructs the debugger to resume program execution.

Figure 17:
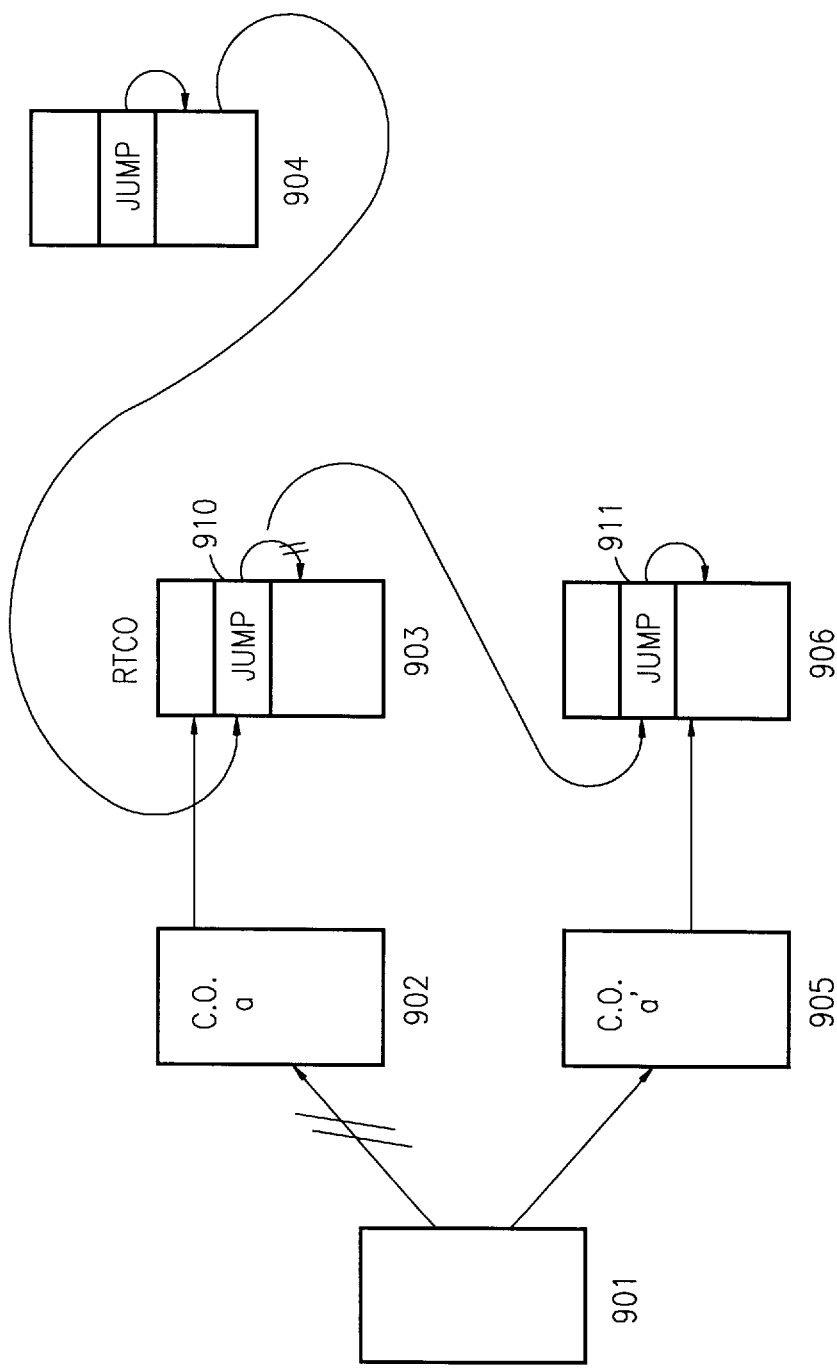
FIG. 17 is a diagrammatic representation of the mechanism for ensuring that changes made to a code object are properly addressable by a dependent runtime code object.

The debugger directs the imager 200, at step 11, to update the code objects affected by the editing as shown in FIG. 17. Having reference to that figure, IL symbol 901 caused the creation of code object 902 which in turn invoked the creation of runtime code object 903. For the purposes of illustration, in this example, runtime code object 903 is referred to by a second runtime code object 904. After the developer edits that portion of the source code which caused program failure, e.g. an improperly defined function 901, the pointer from IL symbol 901 which represents the function is reset from old code object 902 to the new code object 905 which embodies the corrected function. New code object invokes the creation of a new code object 906. To effect this functionality, the pointer 910 of old runtime code object 903 is reset from line 0 of its contained code to line 0 of the contained code of new runtime code object 906.

Figure 18:
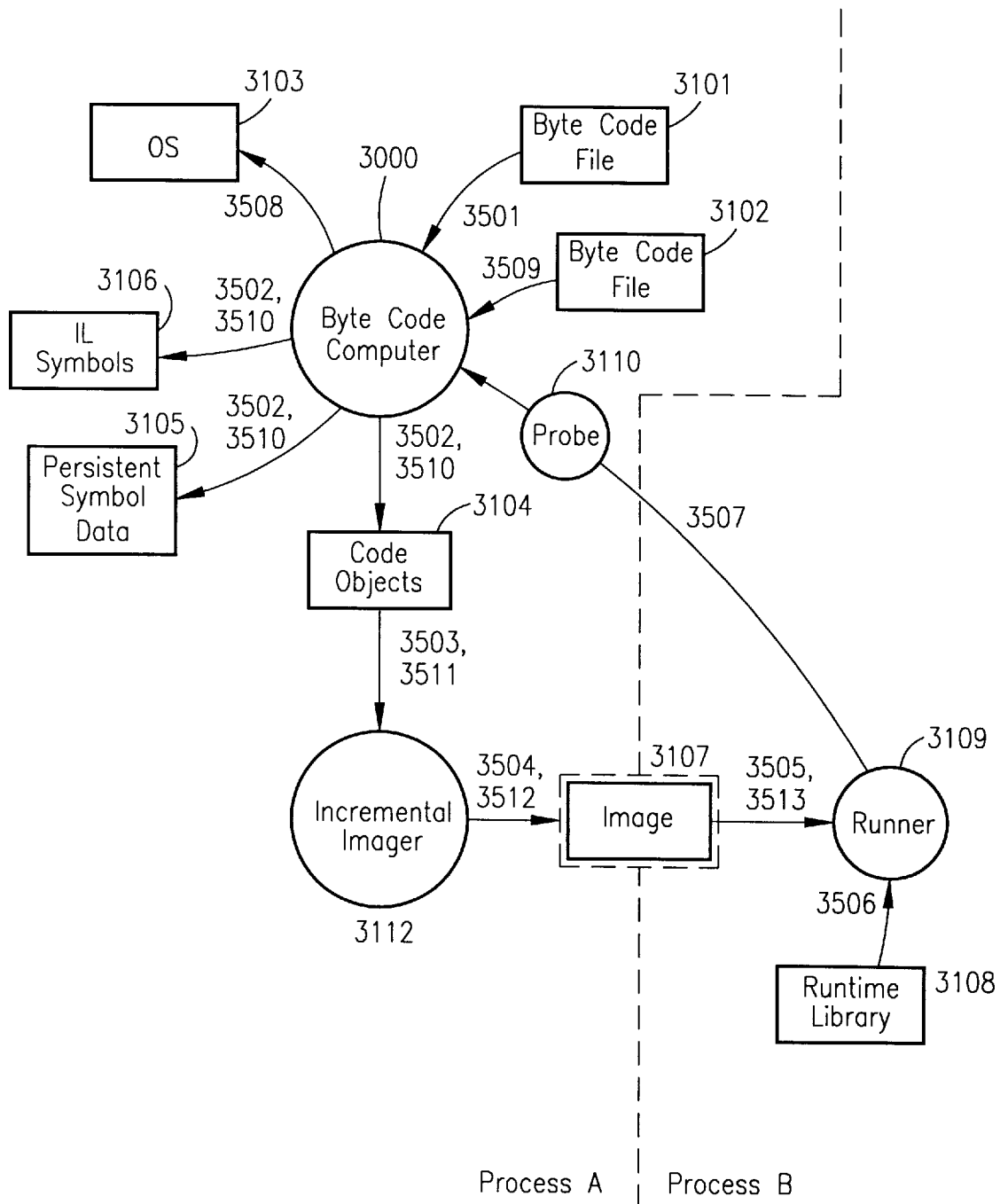
FIG. 18 is a flow diagram of the incremental byte code compiler of the present invention.

Referring now to FIG. 18, the principles of the present invention applied to the dynamic loading of program units are shown. At step 3501 an initial byte code file (or stream of byte code) 3101 is passed to byte code compiler 3000. Byte code compiler 3000 runs in a first process, hereinafter referred to as process A. Byte code file 3101 is compiled by byte code compiler 3000 at step 3502, resulting in a number of code objects 3104, a set of IL symbols 3106, and other persistent symbol table data 3105. Code objects 3104, persistent symbol table data 3105 and IL symbols 3106 are stored in persistent symbol table 5 (not shown).

Utilizing incremental imager 3112, code objects 3104 are linked together into an image at steps 3503 and 3504. Step 3503 utilizes IL symbols 3105 with code objects 3104 to correctly determine the exact contents of image 3107. Following formation of image 3107, it is executed by the client hardware in a second process, B, under the supervision of runner 3109. Runner 3109 is notified of the existence of images 107 at step 3505. Image 3107 is thus available to both the address space of process A and the address space of process B as previously discussed.

At some point, the program under execution may need to load an additional program unit, which could be contained in a separate byte code file, for instance, 3102. A runtime library 3108 contains some special hooks in the program environment which informs the runner of the requirement for the additional program unit, 3102, as shown as step 3506, a runtime request. Runner 3109 then communicates, through probe 3110, with byte code compiler 3000 at step 3507, utilizing an inter-process communication, and informing byte code compiler 3000 that new byte code file 3102 is required.

At this point, compiler 3000 interrogates operating system 3103 at step 3508 to find file 3102. Operating system 3103 then loads byte code file 3102 into byte code compiler 3000 at step 3509. Byte code compiler 3000 then compiles byte code file 3102 into a new set of code objects at step 3510. At step 3511, incremental imager 3112 takes the new set of code objects, updates image 3107 at step 3512, and notifies runner 3109 at step 3513. This action satisfies the runtime request, 3506, and the program may continue execution, having been dynamically expanded with the addition of file 3102.

Should a request as in step 3507 be communicated to byte code compiler 3000, and should such a request be for a program unit that is already available, byte code compiler 3000 may determine so by inspecting persistent symbol table data 3105. If the unit is already available, the compilation process is avoided, thereby minimizing execution time by not performing redundant compilations.

The following discussion of a preferred embodiment of the present invention refers specifically to the compilation of Java class files, and includes a pseudocode representation of the present invention configured for the compilation of a class file. It will be readily apparent to those of ordinary skill in the art that this is by way of illustration, and not limitation, and that the principles of the present invention are broadly applicable to a wide variety of programming languages. In teaching the principles of the present invention applied to the Java program language, the pseudocode takes into account several features of that language:

Java programs consist of a collection of classes. There is a one-to-one mapping between classes and class files. (A class file is a representation of a class.)

Class files contain representations of both executable code and declarative information. The declarative information is necessary in order to interpret the code. (For example, references to functions and data are by name and type—class files have no notion of "symbol".)

The declarative portion of a class file can be processed independently of its executable portion.

The compilation/interpretation of a class file implicitly requires the compilation/interpretation of class files for each class the class file refers to.

The executable code in a class file assumes a stack machine as an interpreter. IL represents expressions as trees. Therefore, an essential part of translating class files to IL is transforming sequences of stack operations into trees. The stack implicitly used by the class file bytecodes is the Java virtual machine (VM) stack. Bytecode compilation converts stack machine operations to trees by emulating the VM stack with a stack of IL expressions (the expression stack) during compilation.

Translation of a class file occurs in two parts. The first part ("declaration") processes declarative information and creates symbol table. The second part ("compilation")processes executable code (bytecode) and creates IL. The class-file translator maintains a list of class files requiring compilation (the compilation list). Translation begins with the declaration of a particular class file.

```
For the class:
  Translation of class file:
    Declaration of the class
    Do while the compilation list is non-empty:
      Compile the first class on the list.
      Remove the first class from the list.
    End do
  End
```

The preceding functions are expanded as follows:

```
Declaration of the class:
  Declare the superclass of the class.
  Do for each data member and method member of the class:
    Declare all classes used in the member's type.
    Create symbol table objects to represent the member.
  End do
  Create data structures (e.g., virtual function tables) that support
    execution of the class's code.
  Put the class at the end of the compilation list.
End
Compile the class file:
  For each method defined in the class file:
    For each bytecode operator in the method:
      If the operator makes reference to a class
        Declare the class.
      End if;
      Generate an IL operator (or operators) with a meaning
        equivalent to the bytecode operator. If the bytecode
        operator expects one or more operands to come from
        the VM stack, pop the equivalent operands from the
        expression stack. If the bytecode operator leaves a result on
        the VM stack, push the corresponding IL expression on the
        expression stack. If the bytecode performs an imperative
        operation, produce the corresponding IL instruction.
    End for;
    Supply the synthesized IL to the code generator which creates a
      code object representing the definition of the method.
  End for;
End.
```

The present invention may be implemented on any data storage or transfer medium known to those of ordinary skill in the art. By way of illustration, but not limitation, such media include but are not necessarily limited to: magnetic media including magnetic disks, tapes, hard drives and the like; electronic memory devices including RAM, flash memory and the like; mechanical data storage materials including punch tape and Hollerith cards; and optical media including CD-ROM, "floptical" drives and the like. Furthermore, the principles of the present invention specifically contemplate the transfer thereof over any media including telephone lines or other electronic networks to include local and wide area nets, including but not limited to the Internet. The principles of the present invention further specifically contemplate such implementation for the storage, use, transfer, sale, lease, rental or any and all other usages thereof.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. The invention disclosed herein may be practiced without any element which is not specifically disclosed herein.

What is claimed is:

1. A method for increasing the execution speed of a computer program written in a computer language having facilities for dynamically adding program elements under control of the program itself, said method comprising the steps of:

executing said program in a first thread of execution:

dynamically adding a program element to said program under control of said program itself, said step of dynamically adding a program element including the further steps of generating a request from said program to dynamically add a program element to said program, communicating said request to a translation means executing in a second thread of execution, employing said translation means, translating said program element into code objects and IL symbols, and incrementally updating the image, using memory mapped data, of said program from said code objects and IL symbols in said second thread of execution; and thereafter continuing execution of said program in said first thread of execution embodying the updated image of said program incorporating said program element.

2. The method of claim 1 wherein said step of translating said program element further comprises the step of implementing an incremental byte code compiler as said translation means.

3. The method of claim 1 further comprising the step of storing said code objects and said IL symbols in a persistent symbol table.

4. Apparatus for increasing the execution speed of a computer program written in a computer language having facilities for dynamically adding program elements under control of the program itself, said apparatus including a programmable computer further including a central processing unit, memory, and input and output devices, the apparatus further comprising:

execution means for executing said program in a first thread of execution;

means for dynamically adding a program element to said program under control of said program itself, said means for dynamically adding a program element including request generation means for generating a request from said program to dynamically add a program element to said program, translation means, executing in a second thread of execution, for translating said program element into code objects and IL symbols, communication means for communicating said request to said translation means, and incremental update means for incrementally updating the image, using memory mapped data, of said program from said code objects and IL symbols in said second thread of execution; and responsive to the adding a program element to said program by said programmatic means for dynamically adding a program element, means for continuing execution, in said first thread of execution, of said program embodying the updated image of said program incorporating said program element.

5. The apparatus of claim 4 wherein said translation means further comprises an incremental byte code compiler.

6. The method of claim 4 further comprising a persistent symbol table for storing said code objects and said IL symbols.

* * * * *